United States Patent [19]
Deshimaru et al.

[11] Patent Number: 5,978,733
[45] Date of Patent: Nov. 2, 1999

[54] ROUTE SEARCH APPARATUS

[75] Inventors: Masatsugu Deshimaru, Ebina; Takashi Nomura, Chigasaki; Takashi Mori, Fujisawa, all of Japan

[73] Assignee: Xanavi Informatics Corporation, Kanagawa, Japan

[21] Appl. No.: 08/986,388

[22] Filed: Dec. 8, 1997

[30]     Foreign Application Priority Data

Dec. 9, 1996  [JP]  Japan ................................. 8-328738
Dec. 9, 1996  [JP]  Japan ................................. 8-328739
Dec. 9, 1996  [JP]  Japan ................................. 8-328740

[51] Int. Cl.$^6$ ................................................. G06F 165/00
[52] U.S. Cl. .................... 701/209; 701/201; 701/206; 701/207; 701/208; 340/988; 340/990
[58] Field of Search ................................... 701/200, 201, 701/206, 207, 208, 209, 210, 211; 73/178 R; 340/988, 990, 995

[56]              References Cited

U.S. PATENT DOCUMENTS

| 4,937,753 | 6/1990 | Yamada ................................. 701/209 |
| 5,231,584 | 7/1993 | Nimura et al. ......................... 701/209 |
| 5,285,391 | 2/1994 | Smith, Jr. et al. . |
| 5,414,629 | 5/1995 | Inoue . |
| 5,752,217 | 5/1998 | Ishizaki et al. ........................ 701/209 |
| 5,899,955 | 5/1999 | Yagyu et al. ........................... 701/209 |

FOREIGN PATENT DOCUMENTS

| 0 703 433 | 3/1996 | European Pat. Off. . |
| 0 724 135 | 7/1996 | European Pat. Off. . ...................... |

OTHER PUBLICATIONS

Japanese Abstract No. 08–061972, vol. 096, No. 007, Mar. 8, 1996.

*Proceedings of the Vehicle Navigation and Information Systems Conference (VNIS)*, Sep. 11–13, 1989, pp. 319–323 entitled "Digital Road Map Data Base for Vehicle Navigation and Road Information Systems" by S. Kamijo et al.

*Proceedings of the Vehicle Navigation and Information Systems Conference*, Dearbon, Oct. 20–23, 1991, vol. 1, pp. 427–439 entitled "Research on Anticipatory Route Guidance" by K. Chen et al.

*Primary Examiner*—William A. Cuchlinski, Jr.
*Assistant Examiner*—Gertrude Arthur
*Attorney, Agent, or Firm*—Evenson, McKeown, Edwards & Lenahan, PLLC

[57]                ABSTRACT

A route search apparatus according to the present invention comprises: a storage device that stores link positional information of individual links and link connection information between the links, a minimum unit of road on a map being referred to as a link; a departure point specification device that specifies a point of departure on the map; a destination specification device that specifies a destination on the map; and a control device that selects a start point link that is to constitute a start point of a route search based upon the point of departure specified by the departure point specification device and the link positional information, selects an end point link that is to constitute an end point of the route search based upon the destination specified by the destination specification device and the link positional information, and performs a route search between the start point link and the end point link based upon the link connection information. And the control device selects a plurality of the start point links and a plurality of the end point links.

17 Claims, 22 Drawing Sheets

| | ITEM | NAME |
|---|---|---|
| LINK STRING 1 | LINK STRING INFORMATION | LINK STRING SIZE |
| | | NUMBER OF ELEMENT POINTS |
| | | LINK ATTRIBUTE |
| | | ROAD NAME OFFSET |
| | | ROAD NUMBER |
| | NODE LINK INFORMATION | ATTRIBUTE 1 + X COORDINATE |
| | | ATTRIBUTE 2 + Y COORDINATE |
| | | (IDENTICAL NODE OFFSET) |
| | | (GUIDE OFFSET) |
| | | (LINK NUMBER) |
| | | ⋮ |
| | | ATTRIBUTE 1 + X COORDINATE |
| | | ATTRIBUTE 2 + Y COORDINATE |
| | | (IDENTICAL NODE OFFSET) |
| | | (GUIDE OFFSET) |
| | | (LINK NUMBER) |
| | | ALTITUDE INFORMATION |
| | | ⋮ |
| | | ALTITUDE INFORMATION |
| ⋮ | | |
| LINK STRING n | LINK STRING INFORMATION | |
| | NODE LINK INFORMATION | |

FIG. 3

| | ITEM | NAME |
|---|---|---|
| LINK STRING 1 | LINK STRING INFORMATION | LINK STRING SIZE |
| | | NUMBER OF ELEMENT POINTS |
| | | LINK ATTRIBUTE |
| | | ROAD NAME OFFSET |
| | | ROAD NUMBER |
| | NODE LINK INFORMATION | ATTRIBUTE 1 + X COORDINATE |
| | | ATTRIBUTE 2 + Y COORDINATE |
| | | (IDENTICAL NODE OFFSET) |
| | | (GUIDE OFFSET) |
| | | (LINK NUMBER) |
| | | ⋮ |
| | | ATTRIBUTE 1 + X COORDINATE |
| | | ATTRIBUTE 2 + Y COORDINATE |
| | | (IDENTICAL NODE OFFSET) |
| | | (GUIDE OFFSET) |
| | | (LINK NUMBER) |
| | | ALTITUDE INFORMATION |
| | | ⋮ |
| | | ALTITUDE INFORMATION |
| ⋮ | | |
| LINK STRING n | LINK STRING INFORMATION | |
| | NODE LINK INFORMATION | |

FIG. 7B

| BIT | DETAILS | |
|---|---|---|
| 15 - 11 | ONE-WAY TRAFFIC | ① NO ONE-WAY ROAD |
| | | ② ONE-WAY TRAFFIC IN FORWARD DIRECTION *1 |
| | | ③ ONE-WAY TRAFFIC IN REVERSE DIRECTION *2 |
| | | ④ NO TRAFFIC IN BOTH DIRECTIONS *3 |
| | CLASSIFICATIONS OF WIDTHS *4 | ⑤ LESS THAN 5.5m OR NOT KNOWN |
| | | ⑥ 5.5 THROUGH 13m (OR ONE THROUGH 2 LANES) |
| | | ⑦ 13m OR MORE (OR THREE THROUGH 4 LANES) |
| | | ⑧ 5 THROUGH 6 LANES OR MORE |

*1    1-WAY TRAFFIC IN THE FORWARD DIRECTION MEANS THAT TRAVELING IS ALLOWED ONLY IN THE DIRECTION WHICH CONFORMS TO THE ORDER IN WHICH LINK STRING DATA POINTS ARISE.

*2    1-WAY TRAFFIC IN THE REVERSE DIRECTION MEANS THAT TRAVELING IS ALLOWED ONLY IN THE DIRECTION WHICH IS REVERSE FROM THE ORDER IN WHICH LINK STRING DATA POINTS ARISE.

*3    NO TRAFFIC ALLOWED IN BOTH DIRECTIONS MEANS THAT TRAVELING IS NOT ALLOWED EITHER IN THE DIRECTION CONFORMING TO THE ORDER IN WHICH THE LINK STRING DATA POINTS ARISE OR IN THE DIRECTION THAT IS REVERSE.

*4    THE TOTAL NUMBER OF LANES FOR BOTH FORWARD AND REVERSE DIRECTIONS IS INDICATED AS THE NUMBER OF LANES. WHEN FORWARD DIRECTION LANES AND REVERSE DIRECTION LANES ARE SEPARATED, THE NUMBER OF LANES IS INDICATED SEPARATELY FOR THE FORWARD DIRECTION AND REVERSE DIRECTION.

STRUCTURE OF ROUTE SEARCH DATA

STRUCTURE OF RECOMMENDED ROUTE DATA

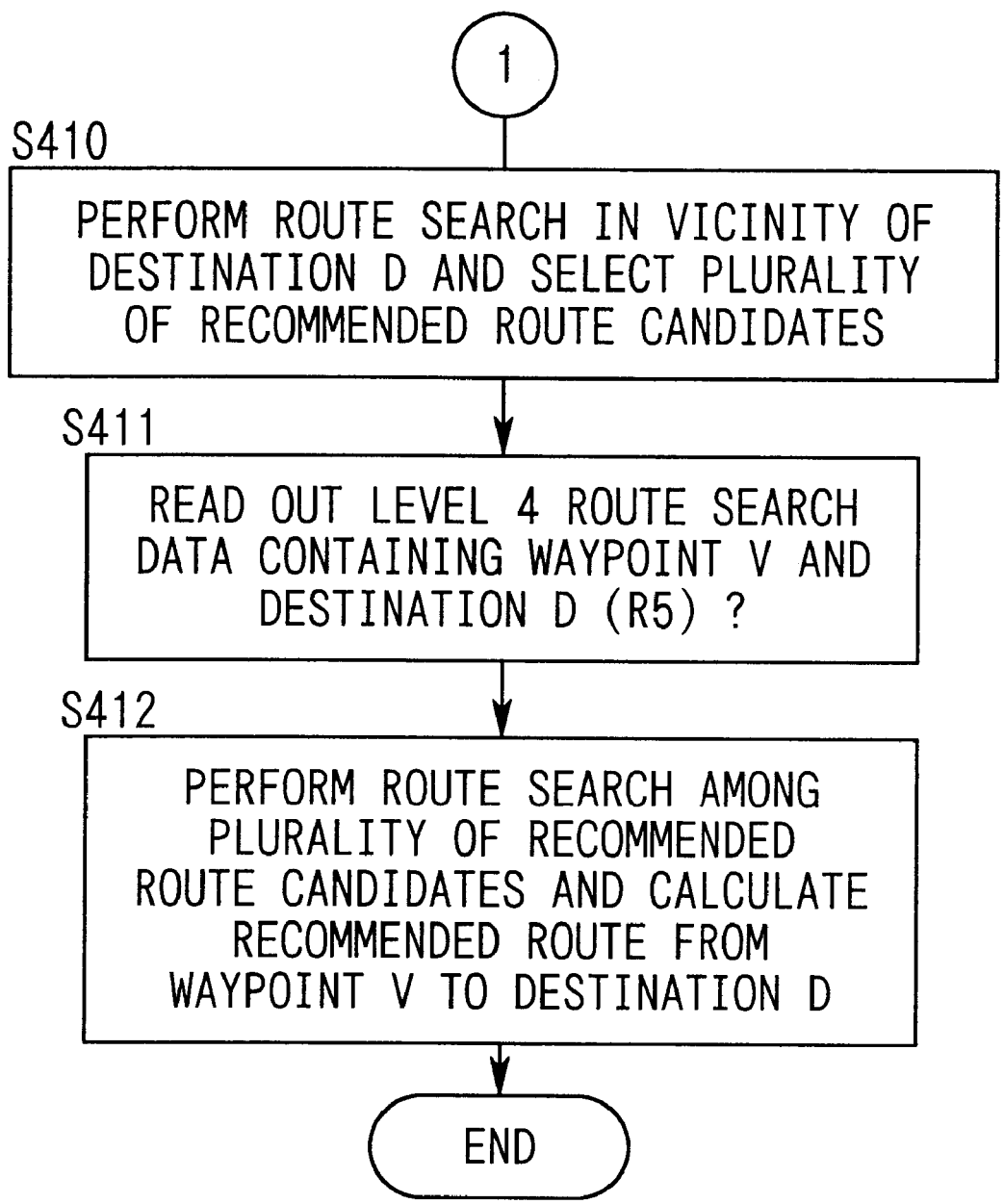

ROUTE SEARCH APPARATUS

BACKGROUND OF THE INVENTION

1. Field of the Invention

The present invention relates to a route search apparatus that may be adopted in navigation systems for vehicles and the like to search a route from a point of departure to a destination.

2. Description of the Related Art

Vehicular navigation systems in the known art are provided with a function for displaying a roadmap of the area where the vehicle is currently located, a function for accurately detecting the vehicle position through map matching, a function for calculating a recommended route from a point of departure to a destination and the like. In these vehicular navigation systems in the prior art, roadmap display data, data for map matching and data for route search are separately stored in a CD ROM.

The roadmap display data include widest range map data for displaying large areas at the smallest scale, most detailed map data for displaying small areas in detail at the largest scale and a plurality of sets of map data at different scales between that of the widest range map data and that of the most detailed map data. For instance, the widest range map data may be referred to as level 4 data, the most detailed map data may be referred to as level 1 data and the sets of data at scales between those of the level 4 data and the level 1 data may be referred to as level 3 data and level 2 data. And the route search data include two sets of data that correspond to the level 4 and level 2 roadmap data, and the vicinity of the point of departure and the vicinity of the destination are searched using the level 2 data and the other area is searched using the level 4 data for route search to reduce the length of time required for the route search.

However, when one or more waypoints are set between a point of departure and a destination, read out of level 2 route search data and read out of level 4 route search data are mixed, and even if a buffer memory or the like is provided between the CD ROM device and the control device, the read out data are not hit with a high degree of efficiency in the buffer memory, resulting in a reduction in processing speed.

Moreover, it is desirable that the processing time required for route search be reduced, since, once the user issues an instruction for route search start to the system after setting a destination and the like, the results of the route search should be output as soon as possible so that the user will not have to wait for the results.

Also, when calculating a recommended route from a point of departure (current vehicle position) to a destination, a start point is set for route search in the vicinity of the point of departure using the roadmap display data, an end point is set for route search in the vicinity of the destination in a similar manner and then the route search data are used to perform route search between the start point and the end point that have been set. In this process, the closest road (the minimum unit of a road is referred to as a link) is selected as the start point or the end point of the route search.

However, if such a road (link) is under a traffic restriction such as one-way traffic and the vehicle cannot advance toward the destination from the point of departure or if the vehicle cannot approach the destination from the direction of the point of departure, the route search is abandoned and results are output indicating that the route search could not be completed.

SUMMARY OF THE INVENTION

The first object of the present invention is to provide a route search apparatus that selects a plurality of roads (links) for the start point and the end point of a route search to reduce the rate at which route searches are thus abandoned.

The second object of the present invention is to provide a route search apparatus with which the processing time can be reduced by reading out route search data with a high degree of efficiency.

The third object of the present invention is to provide a route search apparatus that is capable of reducing the apparent processing time required for a route search.

In order to attain the first object, a route search apparatus according to the present invention comprises: a storage device that stores link positional information of individual links and link connection information between the links, a minimum unit of road on a map being referred to as a link; a departure point specification device that specifies a point of departure on the map; a destination specification device that specifies a destination on the map; and a control device that selects a start point link that is to constitute a start point of a route search based upon the point of departure specified by the departure point specification device and the link positional information, selects an end point link that is to constitute an end point of the route search based upon the destination specified by the destination specification device and the link positional information, and performs a route search between the start point link and the end point link based upon the link connection information And the control device selects a plurality of the start point links and a plurality of the end point links.

In order to attain the second object, a route search apparatus according to the present invention comprises: a storage device that stores link positional information, first link connection information corresponding to a map at a specific scale and second link connection information corresponding to a map extending over a wider range than the map at the specific scale, a minimum unit of road on a map being referred to as a link; a point setting device that sets a point of departure, a waypoint and a destination; and a control device that performs route search leading from the point of departure to the destination via the waypoint. And the control device: (a) performs a first read out for reading out first link connection information near the point of departure that has been set, a second read out for reading out first link connection information near the waypoint that has been set and a third read out for reading out first link connection information near the destination that has been set, and performs a fourth read out for reading out second link connection information over a range containing the point of departure and the waypoint that have been set and a fifth read out for reading out second link connection information over a range containing the waypoint and the destination that have been set; (b) performs route search near the point of departure based upon the first link connection information near the point of departure that has been read out; (c) performs route search near the waypoint based upon the first link connection information near the waypoint that has been read out; (d) performs route search near the destination based upon the first link connection formation near the destination that has been read out; (e) performs route search leading from the point of departure to the waypoint based upon results of the route search near the point of departure, results of the route search near the waypoint and the second link connection information over the range containing the point of departure and the waypoint that has been read out; (f) performs route search leading from the waypoint to the destination based upon results of the route search near the waypoint, results of the route search near the destination and the second link connection information over the range containing the waypoint and the destination that has been read out; and (g) performs the first read out through the third read out ahead of the fourth read out and the fifth read outs In order to attain the third object, a route search apparatus according to the present invention comprises: a storage device that stores link positional information and link connection information, a minimum unit of road on a map being referred to as a link; a point setting device through which a point of departure, a waypoint, and a destination on the map can be set by an operator; a search start instruction device through which an instruction for route search start can be issued by an operator; and a control device that performs route search leading from the point of departure to the destination or route search leading from the point of departure to the destination via the waypoint when the waypoint has been set based upon the link connection information. And, when a point is set through the point setting device, the control device starts a route search near the point based upon the link connection information even if a route search start instruction has not been issued through the search start instruction device.

BRIEF DESCRIPTION OF THE DRAWINGS

FIG. 3 shows the structure of roadmap display data.

FIGS. 7A and 7B show an example of attribute 2+Y coordinate data.

FIGS. 21A and 21B show a flowchart of route search data read out processing and route search processing.

DESCRIPTION OF THE PREFERRED EMBODIMENTS

Figure 1:
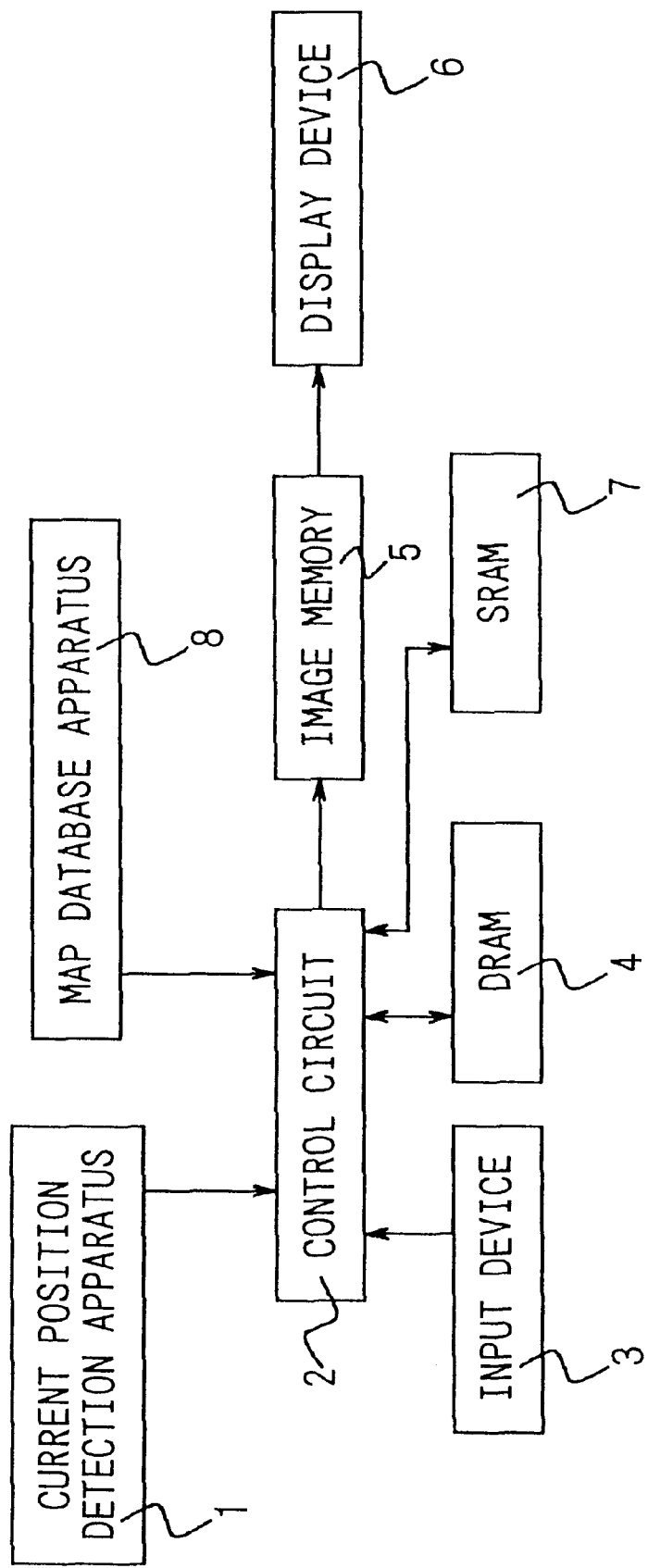
FIG. 1 shows a block diagram of an embodiment of a navigation system for vehicles according to the present invention.

FIG. 1 is a block diagram of an embodiment in which the route search apparatus according to the present invention is adopted in a navigation system for vehicles. In FIG. 1, reference number 1 indicates a current position detection apparatus that detects the current position of a vehicle, which is constituted with, for instance, an azimuth sensor that detects the bearing of the vehicle while traveling, a vehicle speed sensor that detects the speed of the vehicle, a GPS sensor that detects a GPS signal from a GPS (Global Positioning System) satellite and the like.

Reference number 2 indicates a control circuit that controls the entire system and is constituted with a microprocessor and peripheral circuits. Reference number 3 indicates an input device for inputting (or specifying) destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for performing roadmap display, route search, map matching and the like, which is constituted with, for instance, a CD ROM device, a magnetic recording device and the like. In the map database apparatus 8, map display data that constitute information related to road physical forms, road classifications and the like, and route search data that constitute branching point information, intersection information and the like that are not directly related to road physical forms, are stored. The map display data are mainly used when displaying a roadmap on the display device 6 and the route search data are mainly used when calculating a recommended route.

Reference number 9 indicates a buffer memory provided between the map database apparatus 8 and the control circuit 2. When the control circuit 2 is to read out data from the map database apparatus 8, the data are first stored in the buffer memory 9 from the map database apparatus 8 and then the contents of the buffer memory 9 are read out. Consequently, when accessing data in an area of a CD ROM or a magnetic disk, if the data are already present in the buffer memory 9, the data are read from the buffer memory 9 without having to access the CD ROM or the magnetic disk, achieving a reduction in access time. It is to be noted that data are read out to the buffer memory 9 in units of a specific volume and thus, the data read out to the buffer memory 9 may cover a range exceeding what is originally called for.

A-Therefore, it is highly probable that when reading out data that are continuous with data that have been -a previously read out, these data are already present in the buffer memory 9, achieving a reduction in the access time in this aspect, too. As for the operation of the buffer memory, its details are of the known art in computer system technology and will not be explained further here. It is to be noted that the buffer memory 9 may be provided internally at the map database apparatus 8.

Next, the data structures of the map display data and the route search data stored in the map database apparatus 8 are described.

[1] Map display data

(1) Overview of link string data

Figure 2:
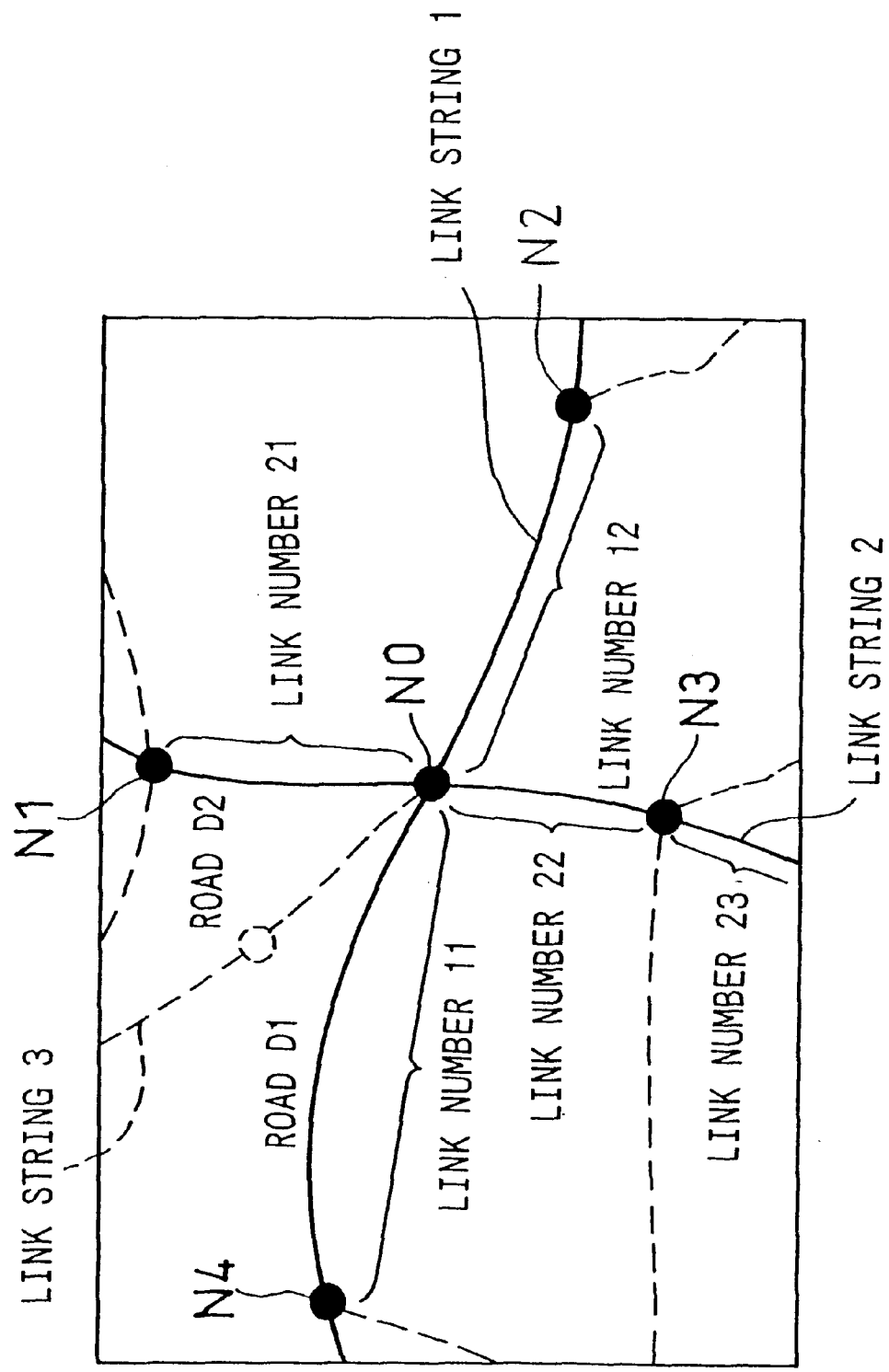
FIG. 2 shows an example of two roads intersecting within a mesh range.

Data management of the map display data in this embodiment is performed for each mesh range representing one of the partitioned areas achieved by dividing a roadmap into specific ranges, and individual roads present in a mesh range constitute separate link strings. For instance, as shown in FIG. 2, when two roads D1 and D2 intersect in one mesh range, the two roads constitute separate link strings 1 and 2, with the link string 1 comprising links 11 and 12 and the link string 2 comprising links 21–23. In this example, the links in the link string 1 and the links in the link string 2 represent roads of the same type. A link is the minimum unit that can represent a road and, in FIG. 2, the segment between the intersections constitutes one link unit, with inherent numbers assigned to the individual links (hereafter referred to as link numbers) for identification. The intersections in FIG. 2, i.e., the connection points of the individual links are expressed as nodes N0 N4. Nodes also constitute the start points and the end points of the individual links and, as detailed later, interpolation points that further divide the segments between nodes may sometimes be provided as well.

The map display data comprise a plurality of sets of data at different scales. In the explanation of this embodiment, the data at each scale are referred to as level n (n may be 1 4, for instance) data. Level 1 corresponds to the most detailed roadmap and as the level goes up, a roadmap over a wider range is presented at a smaller scale. Furthermore, as detailed later, in this embodiment, identical links at different levels are managed with identical (inherent) link number to facilitate making data correspond among different levels. The link number will be explained later.

(2) Data Structure of Link String Data

To give an explanation of the roads in FIG. 2, the map display data are structured by providing sets of link string data, each including various types of information related to the link string 1 or 2-n, for individual link strings, as shown in FIG. 3, and the data corresponding to each link string include link string information and node link information, with the link string information comprising the following types of data, as shown in FIG. 3.

1 link string size
2 number of element points
3 link attribute
4 road name offset
5 road number In addition, the node link information comprises the following types of data, as shown in FIG. 3.

1 attribute 1+X coordinate
2 attribute 2+Y coordinate
3 identical node offset
4 guide offset
5 link number
6 altitude information

(3) Link string information

In FIG. 3, the link string size represents the storage size of the link string data, by referring to this storage size, prompt access to the next link string data is achieved. The number of element points data indicate the total number of node points and interpolation points, the link attribute data indicate the type of road, such as a national highway, a prefectural road, an expressway or the like and the road number is the actual designation number assigned to a national highway or prefectural road. The explanation of the road name offset is omitted since it is not relevant to this embodiment. The interpolation points are to be explained later.

(4) Node Link Information

Figure 4:
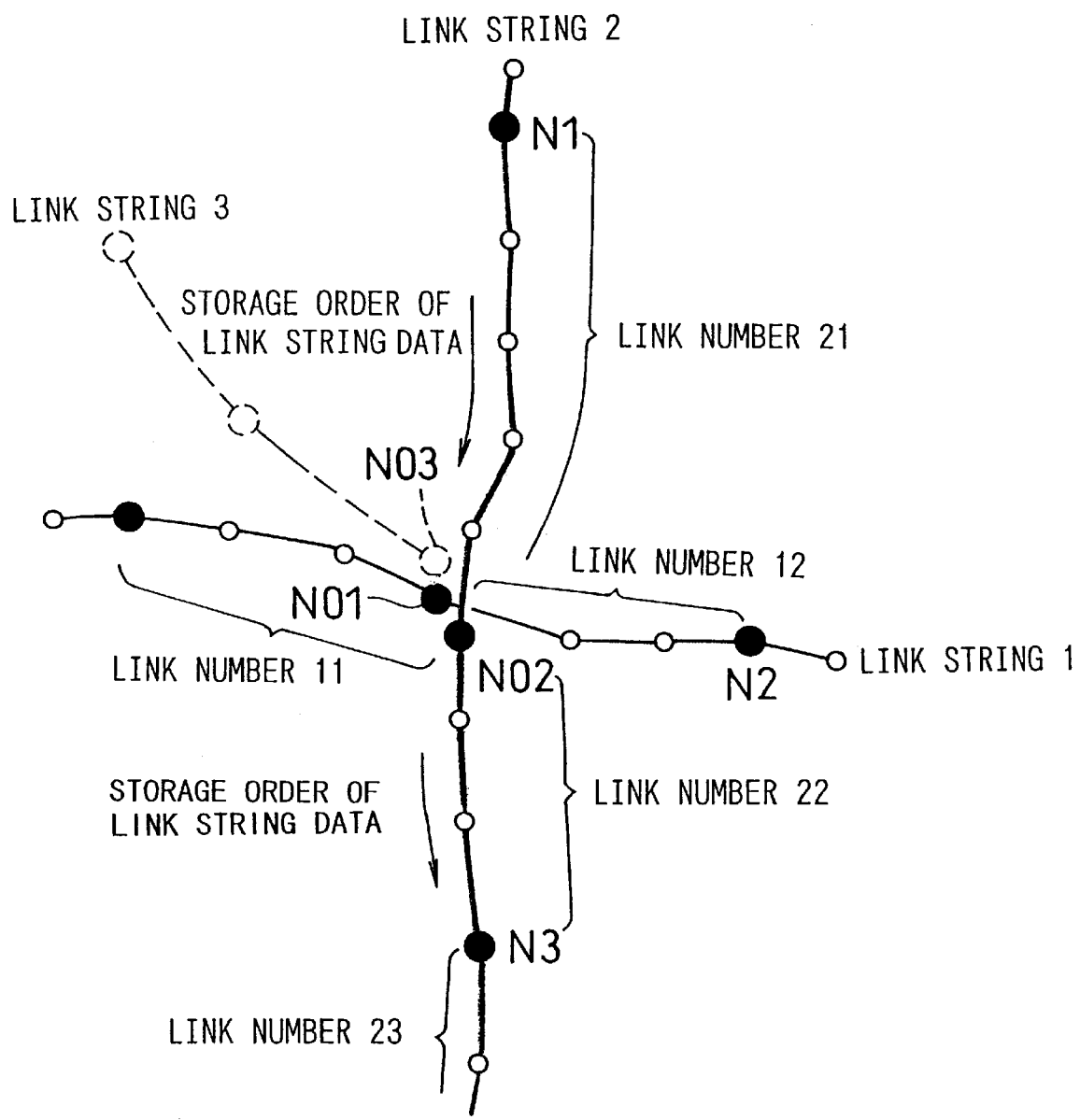
FIG. 4 shows an example of a roadmap with a plurality of nodes and a plurality of interpolation points.
Figure 5:
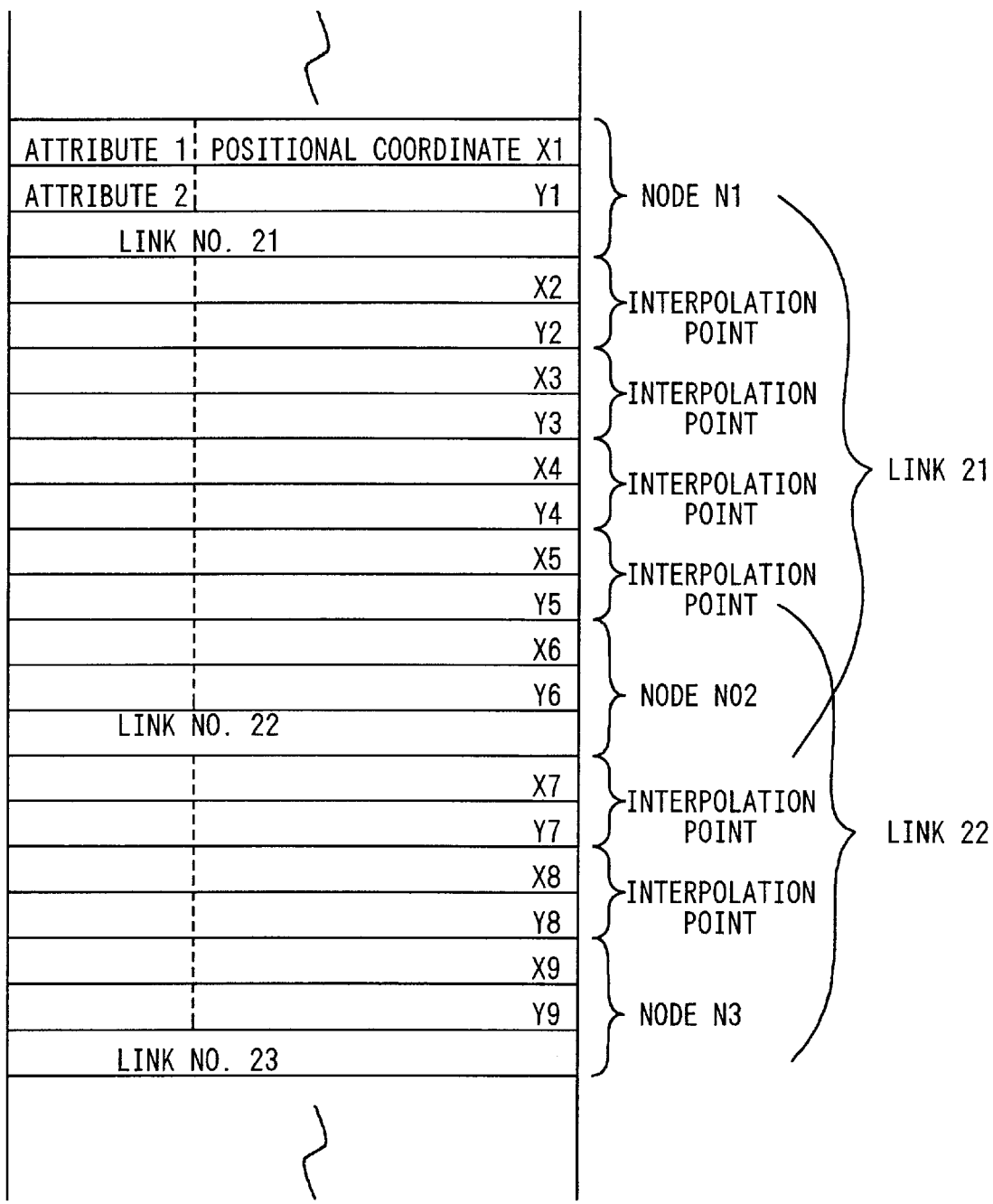
FIG. 5 shows a diagram illustrating the link string data corresponding to the road indicated with the bold line in FIG. 5.

FIG. 4 shows the link strings 1 and 2 in FIG. 2 in more detail. For instance, the node link information of the link string 2 indicated with the bold line in FIG. 4 is as shown in FIG. 5. As shown in the figurer the data on the link string 2 include node information related to nodes N1, N02 and N3 (filled circles in FIG. 4) on the link string and interpolation point information related to the interpolation points (outline circles in FIG. 4). The node information includes positional X and Y coordinates of the node, the attribute and the link numbers of links connected to the node, whereas the interpolation point information includes the positional X and Y coordinates of the interpolation point. These positional coordinates are used as physical form data for recommended route display or physical form data for map matching, to be detailed later. The link string 2 indicated with the bold line in FIG. 4 includes a link assigned with a link number 21 located between the nodes N1 and N02, a link assigned with a link number 22 located between the nodes N02 and N3 and a link assigned with a link number 23 connected to the node N3. As is obvious from FIG. 5, the node information on the node N02 is shared by the link with link number 21 and the link with link number 22. The node information and the interpolation point information are positioned in the data structure in the order in which the links are connected. Thus, by sequentially reading out the link string data starting with the front end address, the road physical form, the road type and the like of the overall link string can be detected.

(5) Attribute 1

Figure 6:
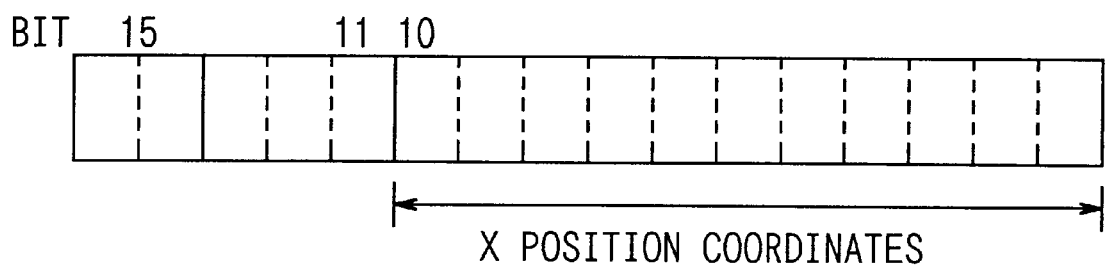
FIG. 6 shows an example of attribute 1+X coordinate data.

The attribute 1 which is stored together with the X coordinate of the node may be utilized in offset information or the like for reading out the link string data in the reverse direction. While, as shown in FIG. 6, the eleventh bit through the fifteenth bit can be utilized, the details are omitted here.

(6) Attribute 2

Figure 7A:
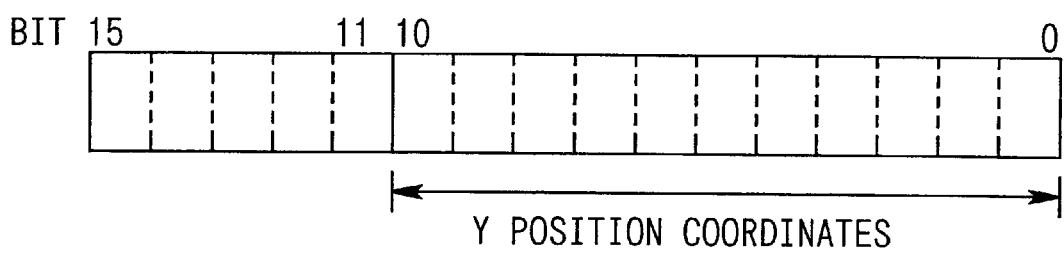

The attribute 2, which is stored together with the Y coordinate of a node, includes traffic regulation information, road width information and number of lanes information. The data length of each set of data of the node link information that constitutes the link string data is 16 bits (2 bytes=1 word). In the lower order 11 bits of the data indicating the attribute 2+Y coordinate, the Y positional coordinates are stored and in the higher order 5 bits, the traffic regulation information, the road width information and the number of lanes information are stored, as shown in FIG. 7A. One type of the information from 1–8 in FIG. 7B is selected through a specific bit combination for the higher order 5 bits.

(7) Inherent Link Numbers Among Levels

As shown in FIG. 3, a link number is stored for each link between the attribute 1+X coordinate, attribute 2+Y coordinate of a node and the attribute 1+X coordinate, attribute 2+Y coordinate of the next node. In this embodiment, the link number assigned to a link at the highest order level is also assigned as the link number of corresponding links at lower order levels. In other words, the link number assigned to a link at the highest order level is also assigned as the link number of the corresponding links at the lower order levels as the inherent link number.

Figure 8:
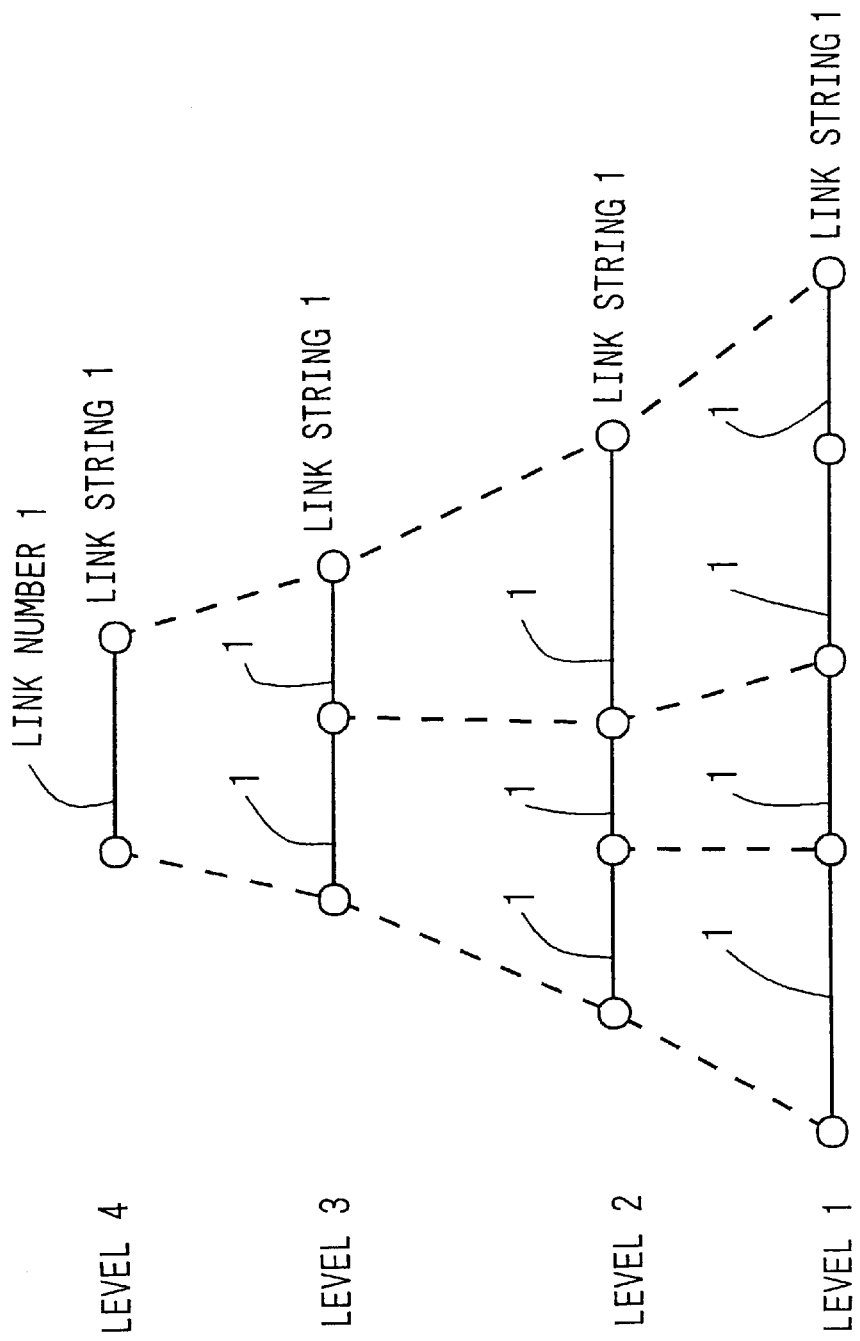
FIG. 8 shows a diagram illustrating link numbers in route search data.

Link numbers are explained in further detail in reference to FIG. 8 which illustrates an example. When a link string 1 at the highest-order level 4 is constituted of one link assigned with a link number 1, this link with the link number 1 at the highest order level 4 will be constituted of two links assigned with the common link number 1 at level 3. At level 2, it will be constituted of three links assigned with the link number 1 and at level 1, it will be constituted of four links assigned with the link number 1.

By using a link number identical to that used at a higher order level for the link number of links at lower order levels that correspond to links at the higher order levels in this manner, the correspondence among identical link strings at different levels and the correspondence of identical link strings in the map display data and the route search data are facilitated, thereby achieving a reduction in processing time. It is to be noted that the explanation of the identical node offset, guide offset and height information in FIG. 3 is omitted.

[2] Route Search Data

The route search data include a plurality of sets of data corresponding to a plurality of sets of roadmap display data for different scales, and the data for each scale are referred to as level m. In this embodiment, data are provided at level 2 and level 4. In addition, as explained before in this embodiment, identical links at different levels are managed through identical link number to facilitate correspondence of data at different levels and the correspondence with the roadmap display data.

Figure 9:
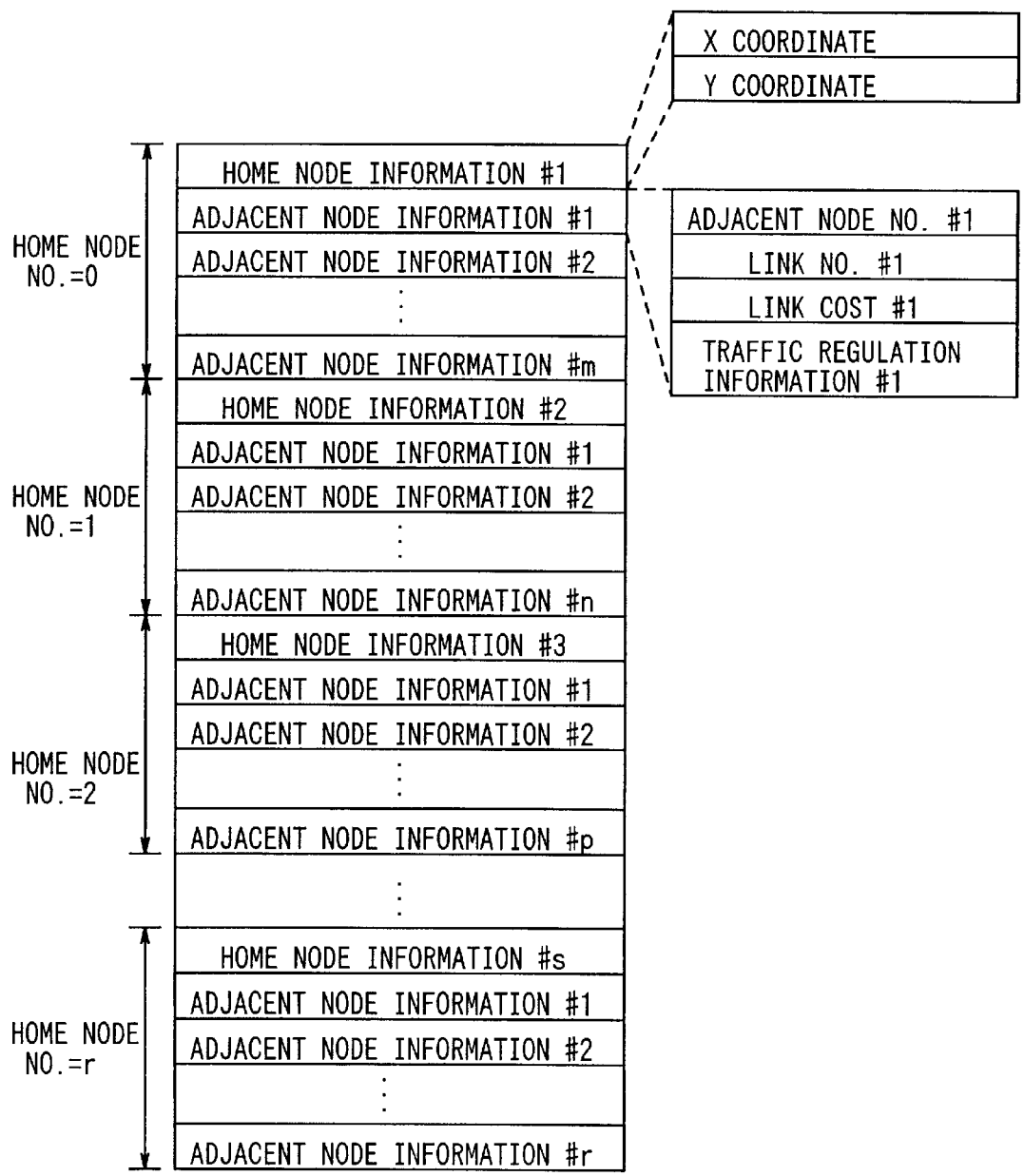
FIG. 9 shows the structure of route search data.

FIG. 9 shows the data structure of route search data. As shown in the figure, in the route search data, node information that indicates the connecting relationship with other nodes is stored for each connecting point (node) of links, which are the minimum units for expressing a road physical form. Each set of node information is constituted with home node information and adjacent node information, with the node positional coordinates stored in the home node information. In the adjacent node information, as shown in the figure, the adjacent node no., the link no. from the home node to the adjacent node, the link cost of the link and traffic regulation information on that link are stored. Also, various sets of node information are stored in the order of link connections and the node no. of the home node can be ascertained by the order in which it is stored. Because of this, even without storing the node nos. of the home nodes as home node information, the node nos. of the home nodes can be ascertained, achieving a reduction in memory requirement.

[3] Recommended route data

Figure 10:
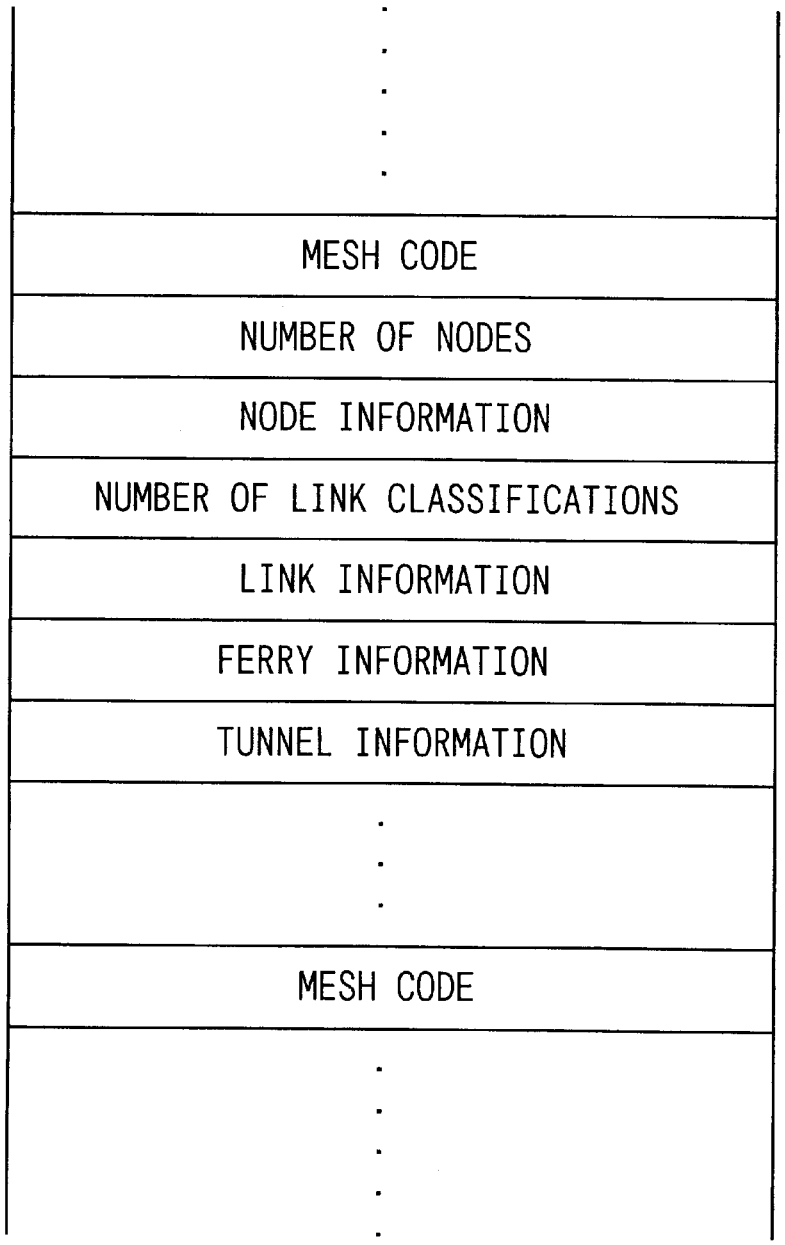
FIG. 10 shows an overview of the structure in the recommended route data.

FIG. 10 shows an outline of the data structure of recommended route data which represent a recommended route from a point of departure to a destination which has been searched based upon the route search data. In the recommended route data, node information and link information on the recommended route are stored, while classified in units of mesh ranges. It is to be noted that a mesh range refers to a partitioned range when a roadmap is partitioned into units of specific ranges.

Figures 11A, 11B:
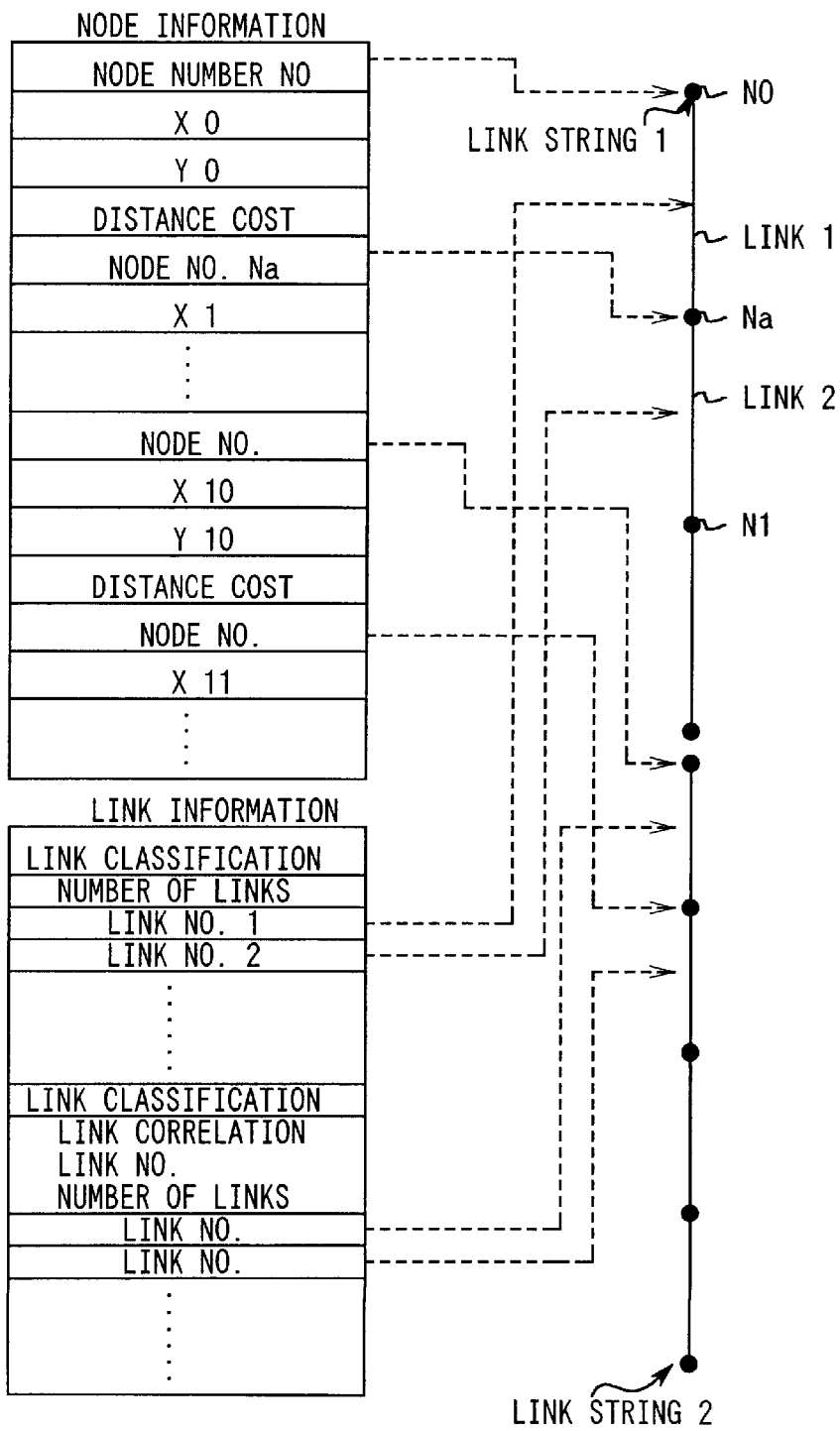
FIGS. 11A and 11B show a detailed diagram illustrating the data structure of the node information and the link information in the recommended route data.
Figure 15:
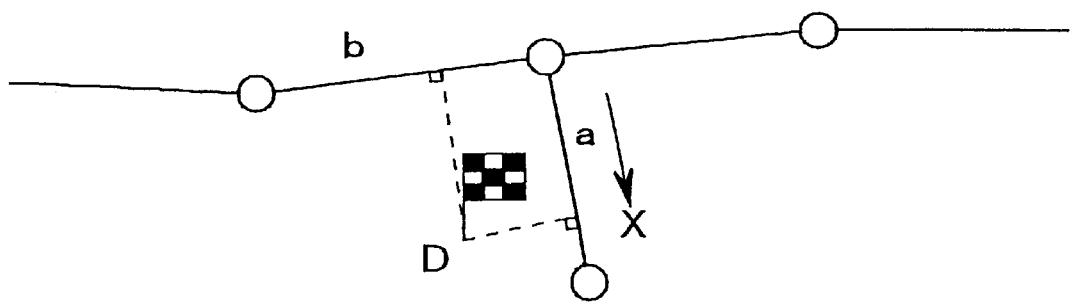
FIG. 15 shows setting the end point of a route search.

As shown in FIG. 10, the recommended route data are constituted with a mesh code, the number of nodes, node information, the number of link classifications, link information, ferry information and tunnel information. The number for identifying the mesh range is stored in the storage area for the mesh code, the number of nodes present within a mesh range is stored in the storage area for the number of nodes and, as shown in detail in FIG. 11A, the node no., the positional coordinates, the distance cost and the like of each node within a mesh range are stored in the storage area for the node information. In addition, the number of link classifications that are present inside a mesh range is stored in the storage area for the number of link classifications and, as shown in detail in FIG. 11B, the link classification, the number of links, the link no. and the like of each link within a mesh range are stored in the storage area for the link information. FIG. 15 illustrates a case in which there are data of link strings 1 through 2 within the area indicated by the same mesh code.

It is to be noted that, as explained above, recommended route data are prepared at different levels and, in this embodiment, recommended route data at level 2 are prepared for the vicinities of the start point and the end point on the recommended route while recommended route data at level 4 are prepared for the middle range between the start point and the end point.

The following is an explanation of the operation performed in this embodiment in reference to the flowchart, and in this embodiment, the recommended route is displayed on the display device 6 in the following manner. The recommended route is searched by using the route search data at level 4 and level 2 to create recommended route data at level 4 and level 2, and then, the recommended route data at level 4 is converted into recommended route data at level 2, and then based upon the recommended route data at level 2 and the roadmap display data at level 2 and level 1, the recommended route is drawn and superimposed upon the roadmap at level 2 or level 1, which is displayed on the display device 6, with the recommended route highlighted with a red bold line, for instance.

Figure 12:
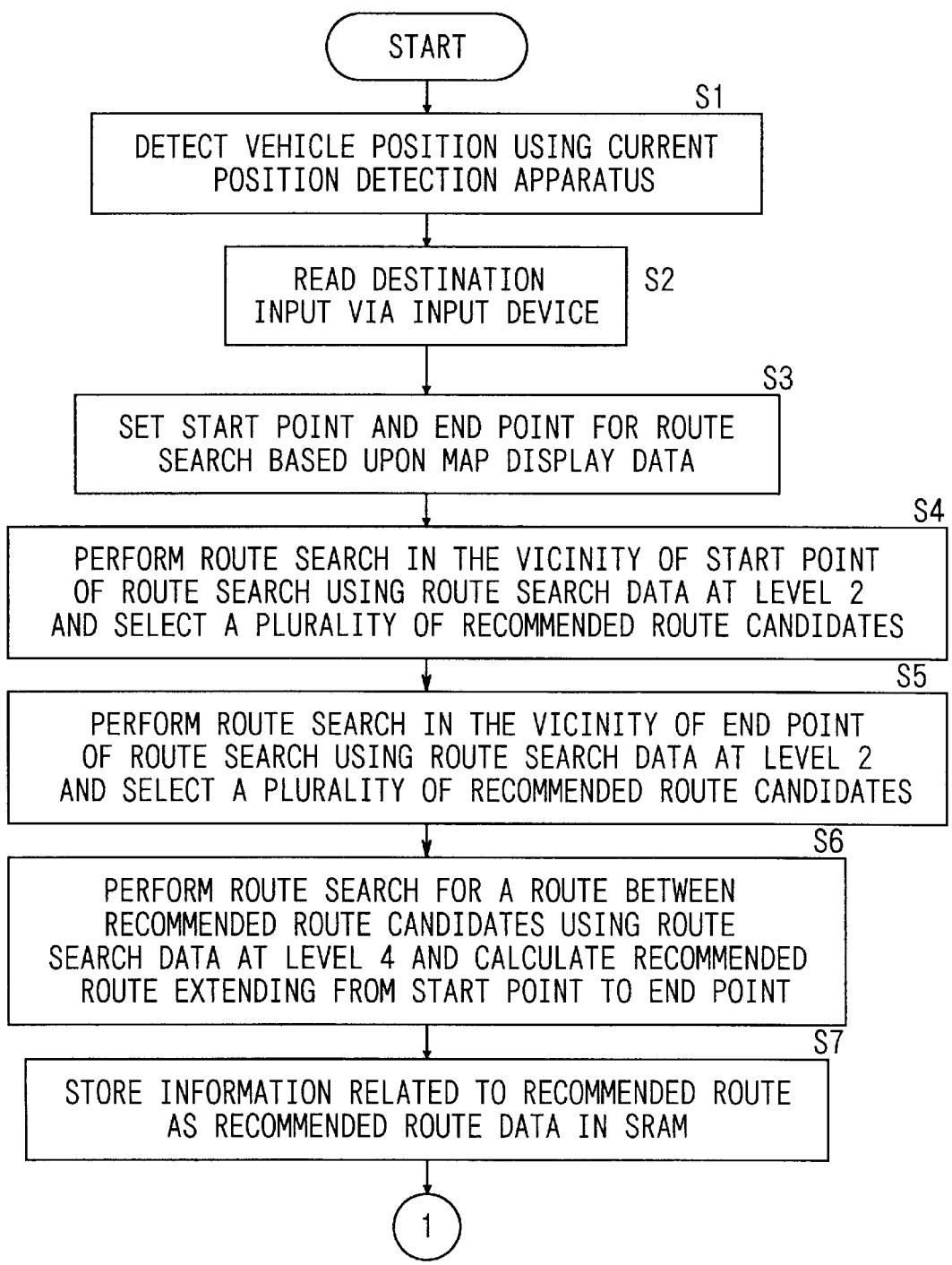
FIG. 12 shows a flowchart outlining the main processing performed by the control circuit.
Figure 13:
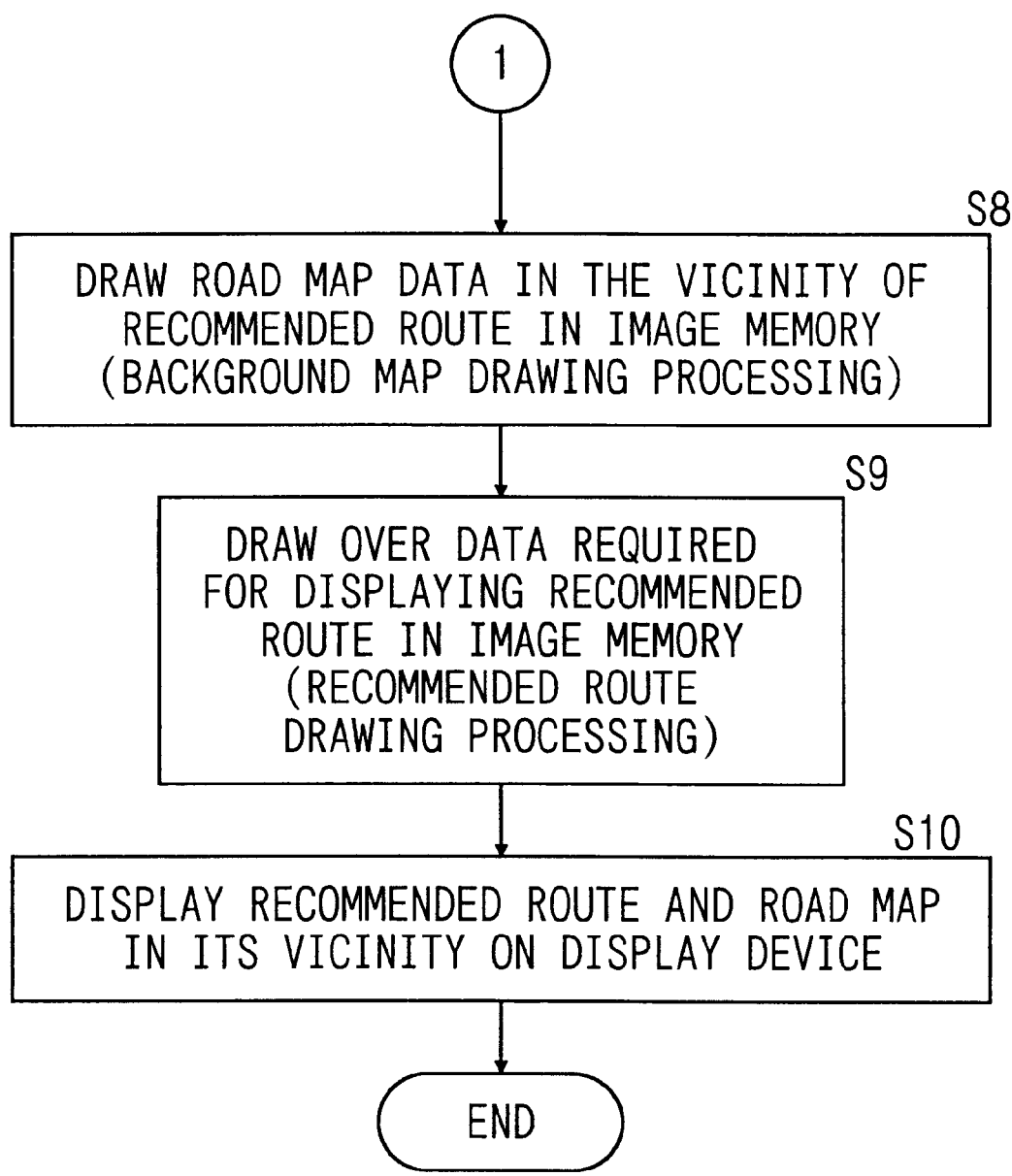
FIG. 13 shows the flowchart continuing from FIG. 12.

FIGS. 12 and 13 are a flow chart illustrating the outline of the main processing performed by the control circuit 2. In step S1 in FIG. 12, the vehicle position is detected by the current position detection apparatus 1. In step S2, the destination, which has been input via the input device 3, is read in. In step S3, based upon the map display data stored in the map database apparatus 8, the start point and the end point of the route search are set on roads for which route search is possible. For instance, the start point of a vehicle may be the current position of the vehicle (vehicle position) and the end point is the destination. Setting a start point and an end point of a route search is explained in further detail later.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

When the processing performed in step S7 in FIG. 12 is completed, the operation proceeds to step S8 shown in FIG. 13, in which the background map drawing processing is performed to draw (store) data related to the roadmap in the vicinity of the recommended route in the image memory 5 for display on the display device 6. When the processing performed in step S8 is completed, the operation proceeds to step S9 in which the data required to display the recommended route calculated in step S6 are also drawn over (stored) in the image memory 5. In step S10, the data stored in the image memory 5 are read out and the recommended route and the roadmap in the vicinity are displayed on the display device 6.

Setting a Start Point and an End Point of a Route Search

Figure 14:
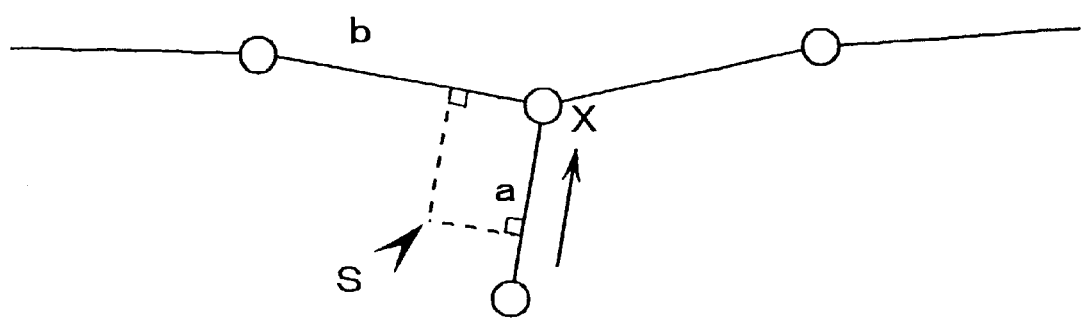
FIG. 14 shows setting the start point of a route search.

Setting a start point and an end point of a route search in this embodiment is explained in further detail. FIG. 14 illustrates the setting of a start point of a route search. The S mark in the figure indicates the vehicle position (the departure position) detected by the current position detection device 1. This vehicle position S constitutes the start point for the route search. There are two roads expressed as links "a" and "b" present in the vicinity of the vehicle position S. In an apparatus in the prior art, a route search is performed by selecting the link "a" which is closest as the start point. However, if this link "a" is, for instance, a one-way street and the vehicle cannot advance in the direction indicated by the arrow in FIG. 14, making it impossible to exit the link "a" in the route search, the route search is abandoned. In this embodiment, a plurality of links are selected within a specific range around the vehicle position S as candidates for the start point. With this, even if a route search is not possible at a given link, route search can be performed with another candidate link. In FIG. 14, the link "a" and the link "b"=0 are selected as candidates for the start point and a route search is performed with both of them. Then, since, even if a route search is not possible with the link "a," the route search using the link "b" as the start point is performed successfully, the outcome whereby the route search is not possible does not result.

FIG. 15, likewise, illustrates the setting of an end point of a route search. The mark D indicates the destination specified through the input device 3. This destination D constitutes the end point of the route search. While a plurality of links are selected around the destination D as candidates for the end point, details are identical to those described above and the explanation is omitted.

Figure 16:
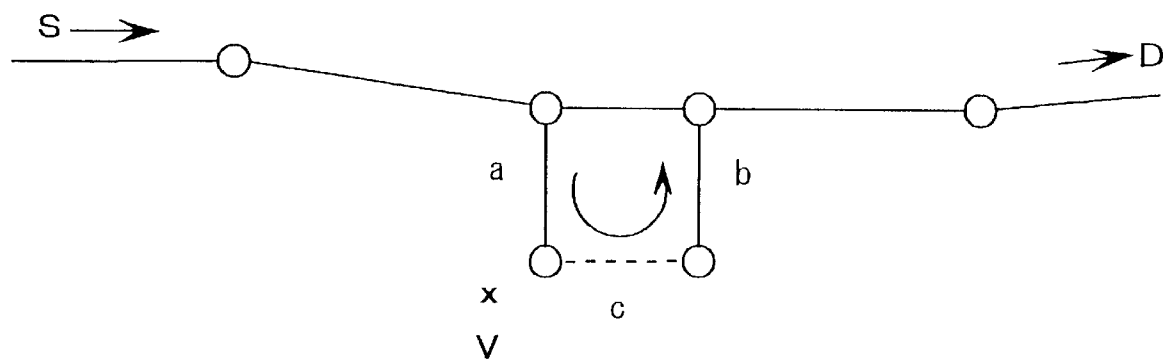
FIG. 16 shows setting a waypoint between the current vehicle position and the destination.

FIG. 16 illustrates a case in which a waypoint V is set between the vehicle position S and the destination D. In the route search from the vehicle position S to the waypoint V, the current vehicle position S constitutes the start point of the route search and the waypoint V constitutes the end point of the route search. Then, in the route search from the waypoint to the destination, the waypoint V constitutes the start point of the route search and the destination D constitutes the end point of the route search. In FIG. 16, the waypoint V may be, for instance, a rotary (roundabout) at a train station with links "a" and "b" being one-way roads in which the traffic proceeds in the direction indicated by the arrow, the current vehicle position S located toward the left and the destination D set toward the right in the figure. Since the waypoint V is a rotary, road data are present for the links "a" and "b". However, the portion indicated as "c" is not set as a road (link) and, as a result, there are no data corresponding to this portion.

In this case, in the route search from the current vehicle position S to the waypoint V, the waypoint V constitutes the end point of the route search and a plurality of links "a" and "b" are selected as candidates. The a route search is performed successfully with the link "a" selected as the end point, whereas the route search using the link "b" as the end point is abandoned because of the direction of the one-way traffic in the link "b." In the route search from the waypoint V to the destination D, the waypoint V constitutes the start point of the route search, and in a similar manner, the links "a" and "b" are selected as candidates for the start point. While the route search using the link "a" as the start point results in an abandoned route search, the a route search is performed successfully when the link "b" is selected as the start point. In this embodiment, in the route search from the current vehicle position S to the destination D via the waypoint V, the road is discontinued at the waypoint V, as described above, so that the individual route searches are output rather than resulting in an entirely abandoned route search.

Figure 17:
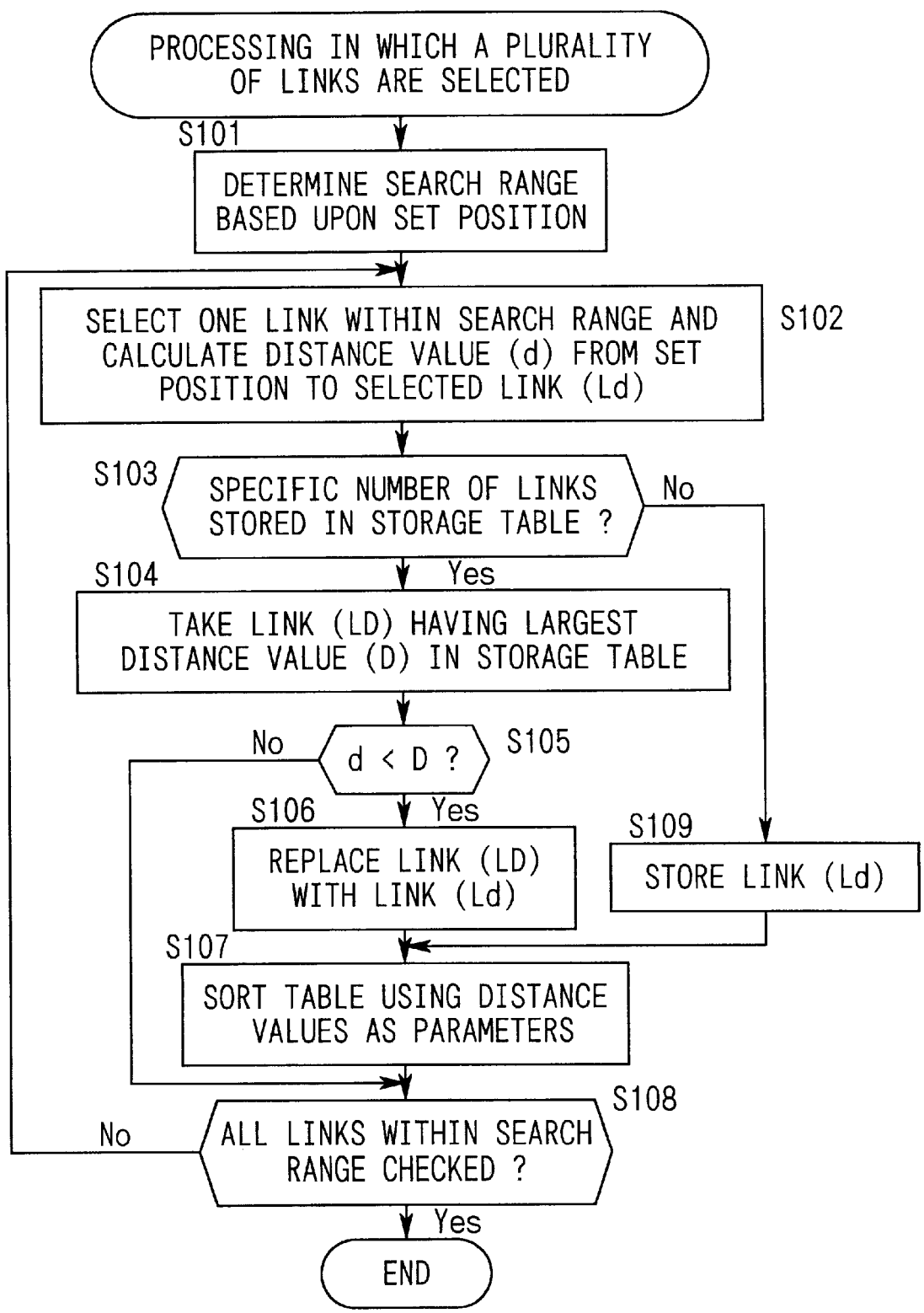
FIG. 17 shows a flowchart illustrating the processing in which a plurality of links are selected.

FIG. 17 is a flowchart illustrating the link selection processing in which a plurality of links are selected at the start point or the end point as explained above to be stored in a storage table.

In step S101, a search range is determined based upon the positions that have been set (the current vehicle position or the departure position, the waypoints, and the destination). The search range is set over a specific range by the program. For instance, the range that can be displayed on the map screen display at the scale with the most detail may be set as the search range, the range of the screen currently on display may be set as the search range or the range which is set by the operator by operating the input device 1 may be set as the search range. This range may be set as a variable setting in correspondence to specific conditions. For instance, the search range may be set variably in correspondence to the node density in the area, by reducing the search range in an area such as downtown Tokyo where the number of nodes is large or enlarging the search range in an area such as a rural area where nodes are sparse. In step S102, one link within the search range is selected and the value of the distance (d) from the position that has been set to the selected link (Ld) is calculated. The distance value (d) represents the length of a perpendicular line extended downward from the set position to the link (Ld) based upon the map display data. If no perpendicular line can extend downward, the distance from the set position to the node that is positioned closest to the set position is selected as the distance value (d). If interpolation points within the links are also to be taken into consideration, the calculation should be performed by replacing the nodes with the interpolation points and then adopting the same concept.

In step S103, a decision is made as to whether or not a specific number of links are stored in the storage table. The specific number in this context refers to the number of the plurality of links selected as candidates at the start point, the waypoint or the end point in the route search. While this number is set in advance in the program, it may also be arbitrarily modified by the operator. If the specific number of links are stored, the operation proceeds to step S104 in which the link (LD) having the largest distance value D among the links already stored in the storage table is taken.

Since the links have been sorted in ascending order with distance value as parameter in step S107, which is to be detailed below, the link that is positioned at the tail end should be taken. In step S105, the distance value (d) of the selected link (Ld) and the distance value (D) of the link (LD) having the largest distance value (D) in the storage table are compared against each other. If the distance value (d) of the selected link (Ld) is smaller than the distance value (D) of the link (LD) having the largest distance value in the storage table, the operation proceeds to step S106 to replace the link LD with the link Ld in the storage table. Next, in step S107, the table is sorted using the distance values as parameters before proceeding to step S108. In step S108, a decision is made as to whether or not a check has been completed for all the links within the search range. If it is decided that a check has been completed for all of them, the processing ends, whereas if it is decided that not all the links have been checked, the operation returns to step S102 to repeat the processing.

If in step S103 described above, it is decided that the number of links stored in the storage table is not equal to the specific number, the operation proceeds to step S109 to store the link Ld that has been selected unconditionally in the table before the operation proceeds to step S107.

Through the processing described above, links that are candidates for the start point and the end point of a route search at the point of departure (vehicle position), the waypoints, and the destination are stored in the table as necessary until the specific number of them are stored in the table, and after the specific number of them are stored in the table, a plurality of links are selected and stored in the table in ascending order, with a replacement made in the table if there is a link with a smaller distance value than the largest distance value belonging to a link in the table. Then, a route search is performed in step S4 in FIG. 12 described earlier at each of the selected plurality of start points. Likewise, a route search is performed in step S5 at each of the selected plurality of end points. Next, in step S6, a route search using level 4 route search data is performed between all the recommended routes that have been searched in steps S4 and S5. It is to be noted that route search using level 4 route search data may be performed only between a specific number of recommended routes by weighting the recommended routes searched in steps S4 and S5. For instance, at a start point, the direction advancing toward the end point may be given priority to be selected, and the first 25 routes with the lowest weighting points (for instance, accumulated totals of distance, cost and the like) assigned to each of the routes may be selected. The same concept applies at the end point. It is to be noted that if both the start point and the end point of a route search are included in the level 2 route search data that are read in order to execute step S4, the route search using the level 4 route search data that is normally executed in step S6 will not be performed since the route search can be completed using the level 2 route search data alone. In addition, if it is predicted that the number of nodes between recommended routes searched in steps S4 and S5 is small, the route search using the level 2 route search data is performed in step S6, too.

Thus, even when a route search is abandoned because of one-way traffic or other restrictions imposed at a link selected as a start point or an end point of the route search, a route search is still performed with the next candidate link selected. As a result, the rate at which the route search is ultimately abandoned is reduced.

While links are selected based upon the distance values to the link in the processing described above, links may be selected using parameters other than the distance values or selection may be made by adding other parameters to the distance values. For instance, priority may be given to the largest road (road with greatest width) in the selection. In addition, selection may be made by weighting the distance values with, for instance, traffic restriction information and the like so that a link where traffic is not allowed in either direction is not selected.

Reading Out Route Search Data When There is a Waypoint

Next, the route search data read out performed when a route search is performed by setting a waypoint between a point of departure and a destination is explained.

Figure 18A:
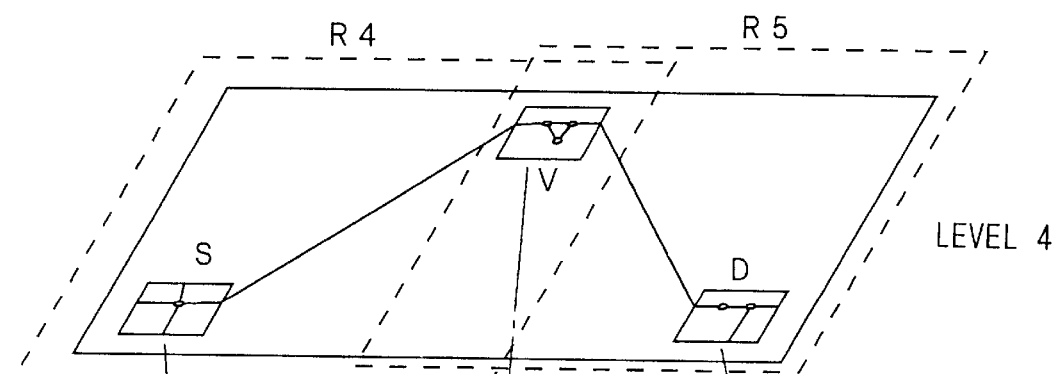
FIGS. 18A and 18B show route search data read out.
Figure 18B:
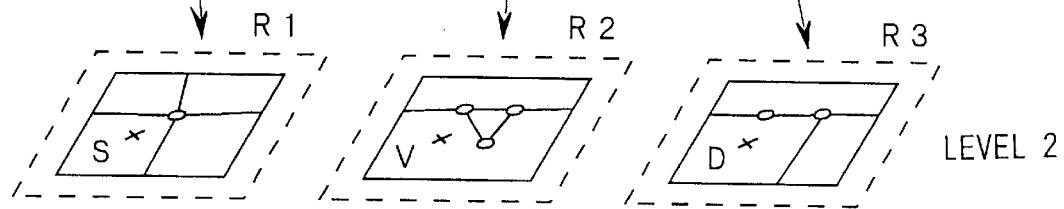
Figure 21A:
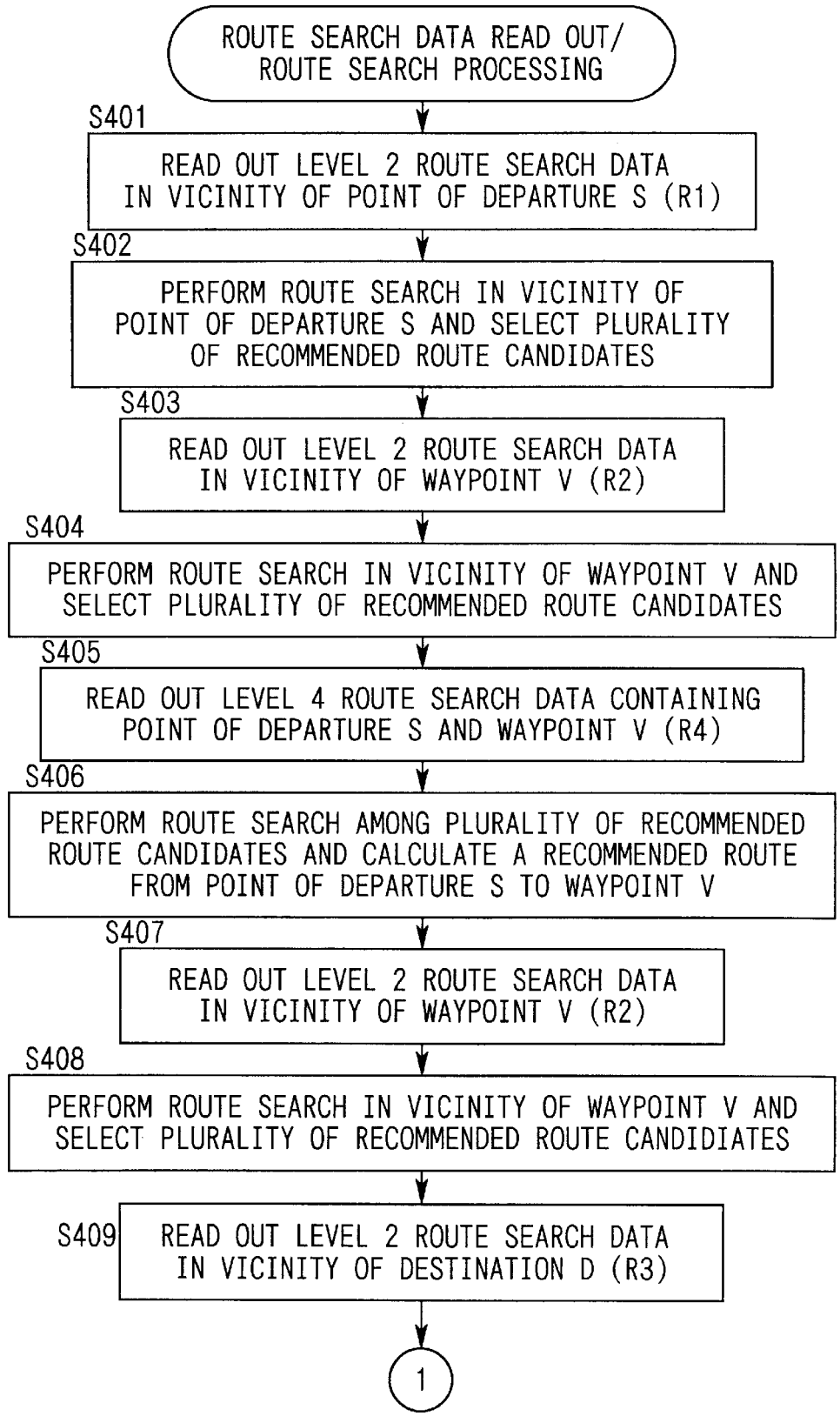

FIGS. 18A and 18B illustrate a route search data read out performed when there is one waypoint V set between the point of departure S and the destination D. As explained earlier, in this embodiment, the route search data are prepared at level 2 and level 4. The level 4 data correspond to the large area map data whereas the level 2 data correspond to map data that are more detailed than the level 4 data. FIG. 18A conceptually illustrates the positions of the point of departure S, the waypoint V and the destination D that have been set in the level 4 route search data. FIG. 18B conceptually illustrates the level 2 route search data that correspond to the vicinities of the point of departure S, the waypoint V and the destination D. Portions R1–R5 enclosed by the dotted lines conceptually represent the ranges over which the route search data are read out from the map database apparatus First, one mode of route search data read out processing and route search processing is explained in reference FIGS. 21A and 21B. FIGS. 21A and 21B are a flowchart of the route search data read out processing and the route search processing performed in an apparatus in the prior art. The explanation of the processing preceding and following the route search data read out processing and the route search processing is omitted here.

First, a route search from the point of departure S to the waypoint V is performed. Since the setting of the start point and the end point of a route search has been already described, a repeated explanation is not given here. In FIG. 21A, level 2 route search data in the vicinity of the point of departure S are read out (R1) in step S401. In step S402, a route search in the vicinity of the start point is performed using the point of departure S as the start point of the route search, to select a plurality of recommended route candidates. In step S403, level 2 a route search data in the vicinity of the waypoint V are read out (R2). In step S404, a route search in the vicinity of the end point is performed using the waypoint V as the end point of the route search to select a plurality of recommended route candidates. In step S405, level 4 route search data that contain the point of departure S and the waypoint V are read out (R3). In step S406, a route search is performed among the plurality of recommended route candidates explained above and a recommended route from the start point to the end point, i.e., from the point of departure S to the waypoint V, is calculated.

Next, a route search from the waypoint V to the destination D is performed. In step S407, level 2 route search data in the vicinity of the waypoint V are read out (R2). In step S408, a route search is performed in the vicinity of the start point using the waypoint V as the start point of the route search, to select a plurality of recommended route candidates. In step S409, level 2 route search data in the vicinity of the destination D are read out (R3). In step S410, a route search in the vicinity of the end point is performed by using the destination D as the end point of the route search to select a plurality of recommended route candidates. In step S411, level 4 route search data that contain the waypoint V and the destination D are read out (R5). In step S412, a route search is performed among the plurality of recommended routes explained above and a recommended route from the start point to the end point, i.e., from the waypoint V to the destination D, is calculated. Thus, a recommended route which leads from the point of departure S to the destination D via the waypoint V is obtained.

In the mode of the route search data read out processing and the route search processing described above, the map database apparatus 8 is accessed in the order of: R1→R2→R4→R2→R3→R5. Normally, when route search data are stored in a CD ROM or the like, they are stored together in units of levels. While the buffer memory 9 is provided between the map database device and the control circuit, when level 4 data are to be accessed after accessing level 2 data and then the level 2 data are to be accessed again, the rate at which the data are found in the buffer memory 9 becomes lower since the previous level 2 data are likely to have been replaced by level 4 data in the buffer memory 9. Consequently, it becomes necessary to access the CD ROM device or the magnetic recording device again, requiring a mechanical operation, which will result in a reduction in the speed of the read out processing.

Figure 19:
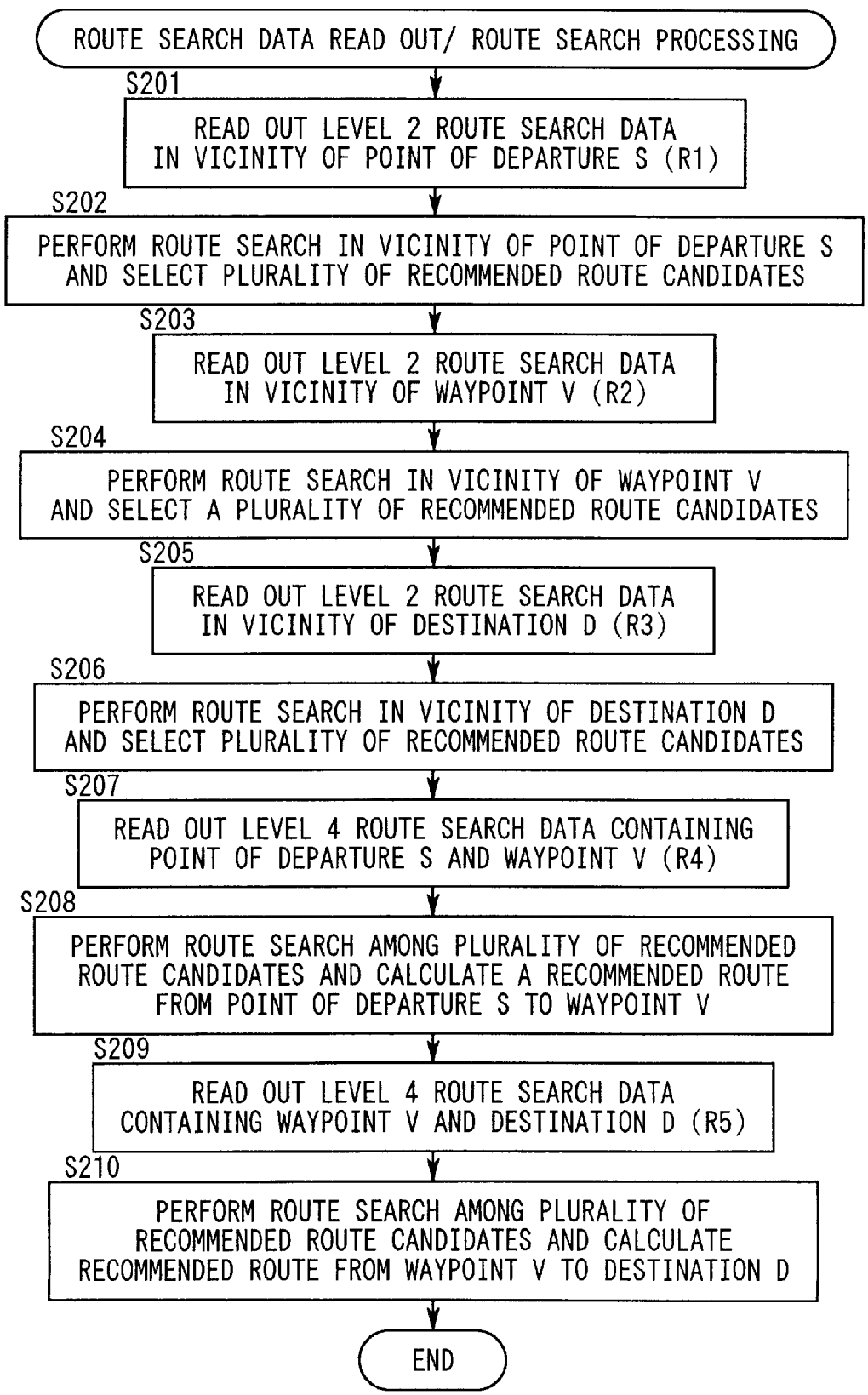
FIG. 19 shows a flowchart of route search data read out processing and route search processing.

FIG. 19 is a flowchart of the modified processing in which the problem discussed above is solved. In FIG. 19, in step S201, level 2 route search data in the vicinity of the point of departure S are read out (R1). In step S202, a route search in the vicinity of the start point is performed using the point of departure S as the start point of the route search to select a plurality of recommended route candidates. In step S203, level 2 route search data in the vicinity of the waypoint V are read out (R2). In step S204, a route search in the vicinity of the end point is performed using the waypoint V as the end point of the route search, to select a plurality of recommended route candidates. In step S205, level 2 route search data in the vicinity of the destination D are read out (R3). In step S206, a route search in the vicinity of the end point is performed using the destination D as the end point of the route search to select a plurality of recommended route candidates.

Next, in step S207, level 4 route search data that contain the point of departure S and the waypoint V are read out (R4). In step S208, a route search is performed among the plurality of recommended route candidates in the vicinity of the point of departure S and in the vicinity of the waypoint V, to calculate a recommended route from the start point to the end point, i.e., from the point of departure S to the waypoint V. In step S209, level 4 route search data that contain the waypoint V and the destination D are read out (R5). In step S210, a route search is performed among the plurality of recommended route candidates in the vicinity of the waypoint V and in the vicinity of the destination D to calculate a recommended route from the start point to the end point, i.e., from the waypoint V to the destination D. Through the processing described above, a recommended route leading from the point of departure S to the destination D via the waypoint V is obtained.

In the improved processing described above, the map database apparatus 8 is accessed in the order of: R1→R2→R3→R4→R5. In this processing, the level 2 route search data are read out in their entirety first, and then the level 4 route search data are read out. Consequently, when the level 2 data corresponding to the range R2 are read out, for instance, it is probable that the data corresponding to the range R3 is read out together in the buffer memory 9, thereby increasing the likelihood of finding the route search data in the vicinity of the destination D over the area R3 in the buffer memory 9 when it next becomes necessary to read out the route search data in the vicinity of the destination D over the range R3. In addition, since the data read out over R4 and the data read out over R5 both contain the waypoint V, the portion of the data that overlap each other is certain to be found in the buffer memory 9 when reading out the data corresponding to the range R5 continuously after reading out data corresponding to the range R4. Moreover, in the flow of this processing, it is not necessary to read the data corresponding to the waypoint V twice, and the route search in the vicinity of the waypoint V only needs to be performed once, both of which also contribute to a reduction in processing time. It is to be noted that the same concept applies when a plurality of waypoint are to be set.

Improving Apparent Processing Speed of Route Search Processing

While, in the explanation of the flowchart in FIG. 12, the route search processing is commenced continuously after the destination and the like are set in steps S2 and S3, instructions that would be provided by the operator and the like are omitted to facilitate the explanation. However, when starting a route search, a route search start instruction is normally input through the input device 3 after the operator sets the destination and the like, and upon this instruction, the program starts the route search.

Figure 20:
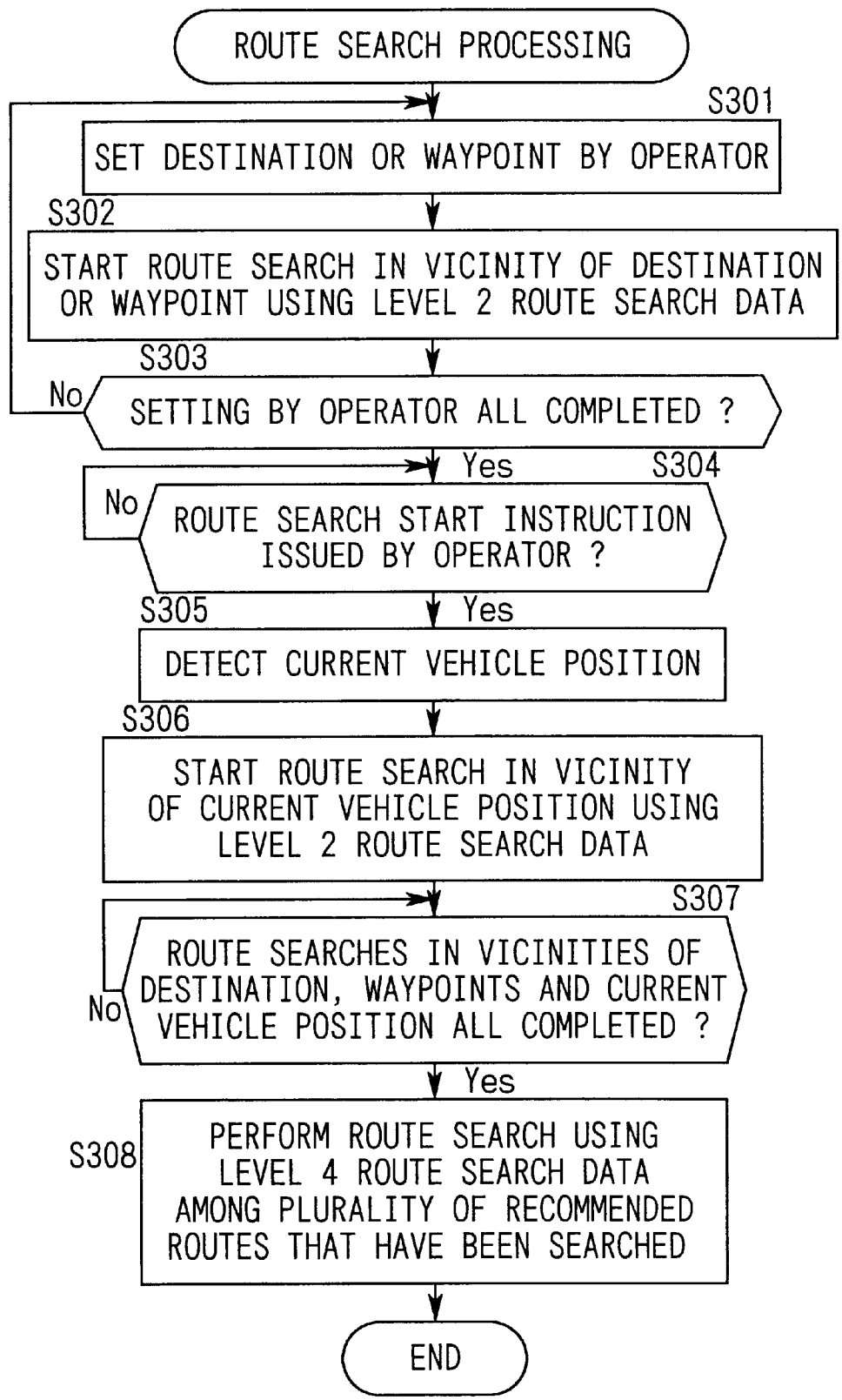
FIG. 20 shows a flowchart of route search processing that improves the apparent processing speed of route search.

In this embodiment, in order to achieve an improvement in the apparent processing speed, this processing is performed in the following manner. FIG. 20 is a flowchart of the route search processing that is implemented in order to improve the apparent processing speed of the route search. In step S301, a destination or a waypoint is set by the operator. In this embodiment, when a destination or one of a plurality of waypoints is set, the operation proceeds to the next step S302. In other words, the processing performed in steps S301–S303 is repeated every time a destination or a waypoint is set. In step S302, a route search in the vicinity of the destination or the waypoint set by the operator is started using level 2 route search data, and the operation proceeds to step S303 without waiting for the completion of this route search processing. In step S303, a decision is made as to whether or not all the settings that need to be made by the operator have been made, and if all the location points have not yet been set, the operation returns to step S301 to repeat the processing. If it is decided that the settings for all the location points have been made in step S303, the operation proceeds to step S304, to wait for a route search start instruction to be issued by the operator. At this point in time, if the route search started in step S302 has not yet been completed, that processing will be in progress. While the explanation has been given separately on step S303 and step S304, settings of all the points may be assumed to have been completed when a route search start instruction is issued by the operator.

When the operator issues a route search start instruction through the input device 3 in step S304, the operation proceeds to step S305. In step S305, the current vehicle position is detected by the current position detection device 1. In step S306, a route search in the vicinity of the current vehicle position is started by using level 2 route search data. The route search in the vicinity of the current vehicle position is started after the route search start instruction is issued by the operator, since, if the vehicle is a underway, the current vehicle position is changing. In step S307, a decision is made as to whether or not all the route searches in the vicinities of the destination, the waypoint and the current vehicle position have been completed. If it is decided that all the route searches have been completed, the operation proceeds to step S308, in which a route search is performed by using level 4 route search data among the plurality of recommended route candidates that have been searched in the vicinities of the destination, the waypoint and the current vehicle position. It is to be noted that when the current vehicle position is within the range that has been searched in the vicinity of the destination by using level 2 route search data, for instance, a route search using level 4 route search data is not performed, and the processing is completed by performing a route search using level 2 route search data. This concept applies to a route search between the point of departure and a waypoint, between a waypoint and the next waypoint and between a waypoint and the destination when waypoints are set.

While the current vehicle position detected by the current position detection device 1 is set as the point of departure in the example given above, the point of departure may be set by the operator through the input device 3 in step S301 as in the case of destinations and waypoints. In that case, a route search in the vicinity of the point of departure thus set is performed in step S302.

Since the route search processing is performed in advance by utilizing the idle time until the operator next issues a route search start instruction after the operator sets the destination and the like, the length of time elapsing after the operator issues the route search start instruction until the route search ends is reduced. In this processing, parallel processing, whereby individual route searches for the destination and waypoints are started and, at the same time, operation by the operator is monitored, is achieved through multitask program processing. After starting the route search processing in advance, if the operator changes the destination or a waypoint, the processing that has already been started is stopped and if the results of the processing have already been acquired, the results only need to be discarded. It is to be noted that a similar concept is applied when a plurality of waypoints are set.

What is claimed is:

1. A route search apparatus comprising:
   a storage device that stores link positional information of individual links and link connection information between said links, a minimum unit of road on a map being referred to as a link;
   a departure point specification device that specifies a point of departure on the map;
   a destination specification device that specifies a destination on the map; and
   a control device that selects a start point link that is to constitute a start point of a route search based upon said point of departure specified by said departure point specification device and said link positional information, selects an end point link that is to constitute an end point of said route search based upon said destination specified by said destination specification device and said link positional information, and performs a route search between said start point link and said end point link based upon said link connection information, wherein:
   said control device selects a plurality of said start point links and a plurality of said end point links.

2. A route search apparatus according to claim 1, wherein:
   said control device selects said plurality of start point links from among links within a specific range from said point of departure and selects said plurality of end point links from among links within a specific range from said destination.

3. A route search apparatus according to claim 1, wherein:
   said control device calculates distances between said point of departure and said links to select said plurality of start point links in ascending order based upon results of the calculation and calculates distances between said destination and said links to select said plurality of end point links in ascending order based upon results of the calculation.

4. A route search apparatus according to claim 1, further comprising:
   a waypoint specification device that specifies at least one waypoint on the map, wherein:
   said control device performs a route search by using said point of departure as a start point for said route search and said waypoint as an end point for said route search when searching routes between said point of departure and said waypoint, performs a route search by using said waypoint as a start point for said route search and said destination as an end point for said route search when searching routes between said waypoint and said destination, and performs a route search by using a preceding waypoint as a start point for said route search and a succeeding waypoint as an end point of said route search when searching routes between two waypoints.

5. A route search apparatus according to claim 1, wherein:
   said link connection information includes traffic restriction information for individual links.

6. A route search apparatus comprising:
   a storage device that stores link positional information, first link connection information corresponding to a map at a specific scale and second link connection information corresponding to a map extending over a wider range than the map at the specific scale, a minimum unit of road on a map being referred to as a link;
   a point setting device that sets a point of departure, a waypoint and a destination; and
   a control device that performs route search leading from said point of departure to said destination via said waypoint, wherein
   said control device:
   (a) performs a first read out for reading out first link connection information near said point of departure that has been set, a second read out for reading out first link connection information near said waypoint that has been set and a third read out for reading out first link connection information near said destination that has been set, and performs a fourth read out for reading out second link connection information over a range containing said point of departure and said waypoint that have been set and a fifth read out for reading out second link connection information over a range containing said waypoint and said destination that have been set;
   (b) performs route search near said point of departure based upon said first link connection information near said point of departure that has been read out;
   (c) performs route search near said waypoint based upon said first link connection information near said waypoint that has been read out;

(d) performs route search near said destination based upon said first link connection formation near said destination that has been read out;

(e) performs route search leading from said point of departure to said waypoint based upon results of said route search near said point of departure, results of said route search near said waypoint and said second link connection information over said range containing said point of departure and said waypoint that has been read out;

(f) performs route search leading from said waypoint to said destination based upon results of said route search near said waypoint, results of said route search near said destination and said second link connection information over said range containing said waypoint and said destination that has been read out; and (g) performs said first read out through said third read out ahead of said fourth read out and said fifth read out.

7. A route search apparatus according to claim 6, wherein:
said control device performs read outs in order of said first read out, said second read out, said third read out, said fourth read out and said fifth read out.

8. A route search apparatus according to claim 6, wherein:
said control device uses said results of said route search near said waypoint commonly for said route search leading from said point of departure to said waypoint and said route search leading from said waypoint to said destination, said results of said route search near said waypoint being route searched based upon said first link connection information near said waypoint read out in said second read out.

9. A route search apparatus according to claim 6, wherein:
said point setting device is capable of setting a plurality of waypoints; and
said control device performs a sixth read out for reading out second link connection information over a range containing said plurality of waypoints that have been set, performs route search between said waypoints based upon results of route search near said plurality of waypoints and said second link connection information over said range containing said plurality of waypoints that has been read out, and performs said first read out through said third read out ahead of said sixth read out.

10. A route search apparatus according to claim 6, wherein:
said storage device comprises a CD ROM device; and
said control device comprises a buffer memory.

11. A route search apparatus according to claim 1, wherein:
said storage device comprises a magnetic disk device; and
said control device comprises a buffer memory.

12. A route search apparatus according to claim 9, wherein:
said control device performs read outs in order of said first read out, said second read out, said third read out, said fourth read out, said sixth read out and said fifth read out.

13. A route search apparatus comprising:
a storage device that stores link positional information and link connection information, a minimum unit of road on a map being referred to as a link;
a point setting device through which a point of departure, a waypoint, and a destination on the map can be set by an operator;
a search start instruction device through which an instruction for route search start can be issued by an operator; and
a control device that performs route search leading from said point of departure to said destination or route search leading from said point of departure to said destination via said waypoint when said waypoint has been set based upon said link connection information, wherein:
when a point is set through said point setting device, said control device starts a route search near said point based upon said link connection information even if a route search start instruction has not been issued through said search start instruction device.

14. A route search apparatus according to claim 13, further comprising:
a current position detection device that automatically detects a position at which said route search apparatus is currently located on the map, wherein:
when said position detected by said current position detection device is set as said point of departure, said control device performs a route search near said position based upon said link connection information after a route search start instruction is issued through said search start instruction device.

15. A route search method, the method comprising the steps of:
(a) storing link positional information of individual links and link connection information between said links, a minimum unit of road on a map being referred to as a link;
(b) specifying a point of departure on the map;
(c) specifying a destination on the map;
(d) selecting a plurality of start point links that are to constitute a start point of a route search based upon said point of departure and said link positional information; and
(e) selecting a plurality of end point links that are to constitute an end point of said route search based upon said destination and said link positional information; and
(f) performing the route search between said start point links and said end point links based upon said link connection information.

16. A route search method, the method comprising the steps of:
(a) storing link positional information, first link connection information corresponding to a map at a specific scale and second link connection information corresponding to a map extending over a wider range than the map at the specific scale, a minimum unit of road on a map being referred to as a link;
(b) setting a point of departure, a way point and a destination on the map;
(c) performing the route search leading from said point of departure to said destination via said way point by:
(i) first reading out first link connection information near said point of departure that has been set, second reading out first link connection information near said way point that has been set, and third reading out first link connection information near said destination that has been set, fourth reading out second link connection information over a range containing said point of departure and said way point that have been set, and fifth reading out second link connection information over a range containing said way point and said destination that have been set;

(ii) performing the route search near said point of departure based upon said first link connection information near said point of departure that has been read out;

(iii) performing route search near said way point based upon said first link connection information near said way point that has been read out;

(iv) performing route search near said destination based upon said first link connection information near said destination that has been read out;

(v) performing route search leading from said point of departure to said way point based upon (a) results of said route search near said point of departure, (b) results of said route search near said way point, and (c) said second link connection information over said range containing said point of departure and said way point that has been read out;

(vi) performing route search leading from said way point to said destination based upon (a) results of said route search near said way point, (b) results of said route search near said destination, and (c) said second link connection information over said range containing said way point and said destination that has been read out; and (vii) performing said first reading out through said third reading out steps ahead of said fourth reading out step and said fifth reading out step.

17. A route search method, the method comprising the steps of:

(a) storing link positional information and link connection information, a minimum unit of road on a map being referred to as a link;

(b) setting a point of departure, a way point and a destination on the map via an operator;

(c) performing a route search leading from said point of departure to said destination or a route search leading from said point of departure to said destination via said way point when said way point has been set based upon said link connection information; and (d) when said setting step sets a point via the operator, starting a route search near said set point based upon said link connection information even if a route search start instruction issuable by the operator has not been issued.

* * * * *